(12) United States Patent
Aaker et al.

(10) Patent No.: US 6,275,199 B1
(45) Date of Patent: Aug. 14, 2001

(54) METHOD AND APPARATUS FOR BACKGROUND AND FOREGROUND COLOR CONTROL OF IMAGE AND FACSIMILE DATA DISPLAY ON A NON-PROGRAMMABLE-TERMINAL

(75) Inventors: Kenneth Dale Aaker; Louis Edward Behrens, both of Rochester; Bruce Richard Culbertson, Kasson; Harvey Gene Kiel; Eric John Nelson, both of Rochester, all of MN (US); Shohji Okimoto, Fujisawa (JP); Steven Joseph Amell, Rochester, MN (US); Ayako Nomura, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/389,927

(22) Filed: Feb. 16, 1995

Related U.S. Application Data

(63) Continuation-in-part of application No. 08/261,321, filed on Jun. 16, 1994.

(51) Int. Cl.[7] .............................. G09G 5/00; G06F 13/00
(52) U.S. Cl. ................................ 345/2; 345/333; 345/335
(58) Field of Search .............................. 345/2, 507, 520, 345/521, 526, 27, 114, 150, 333, 335, 334, 1; 709/220; G09G 5/00; G06F 13/00

(56) References Cited

U.S. PATENT DOCUMENTS

| | | |
|---|---|---|
| 4,791,556 | 12/1988 | Vilkatis . |
| 4,837,710 * | 6/1989 | Zelinsky et al. ................. 364/521 |
| 4,920,514 | 4/1990 | Aoki . |
| 5,072,412 | 12/1991 | Henderson, Jr. et al. . |
| 5,165,012 | 11/1992 | Crandall et al. . |
| 5,530,961 * | 6/1996 | Janay et al. ........................ 395/153 |

OTHER PUBLICATIONS

IBM Technical Disclosure Bulletin, vol. 31, No. 7, Dec. 1988 Graham, Gregg and Sheppard, pp. 346–350, "Routable Soft Panel."

IBM 3164 ASCII Color Display Station Description, pp. 5–64 and 5–65.

* cited by examiner

*Primary Examiner*—Michael Lee
(74) *Attorney, Agent, or Firm*—Joan Pennington; Roy W. Truelson

(57) ABSTRACT

A method and apparatus are provided for displaying image and facsimile data on a host-based application display. A host computer generates control and download command data for displaying the image or facsimile data. The image and facsimile data is processed by a non-programmable-terminal (NPT) or a programmable work station (PWS) for presentation of a display screen. When a user requests another function, the NPT or PWS stores image information and sends image information to the host computer. The save image information includes cache image counter data, scaling and viewed image screen location data that is used to restore the displayed image and facsimile data when the user returns to the previous function. Both the user and host application can specify a foreground color and a background color for the image and facsimile data display.

12 Claims, 26 Drawing Sheets

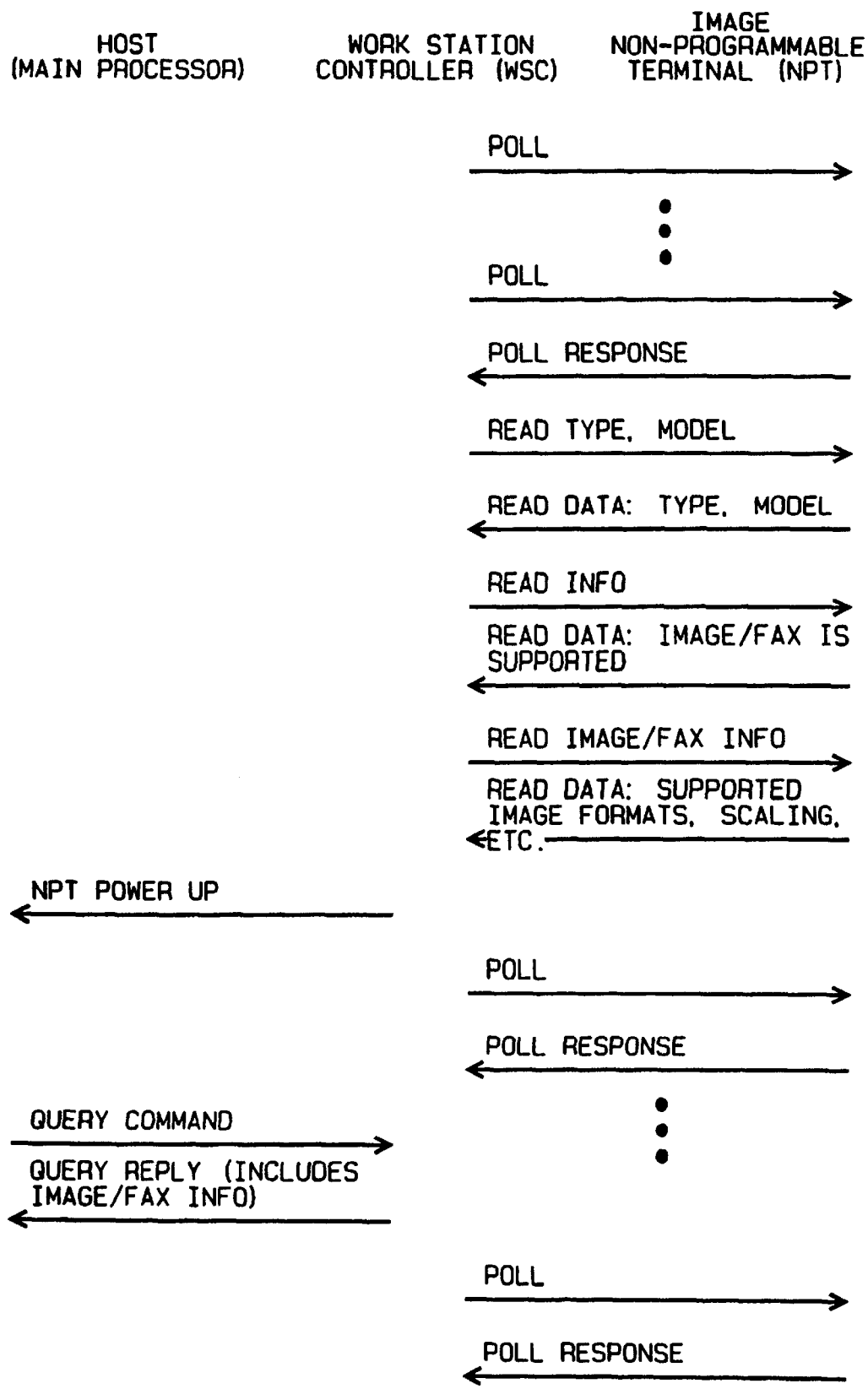

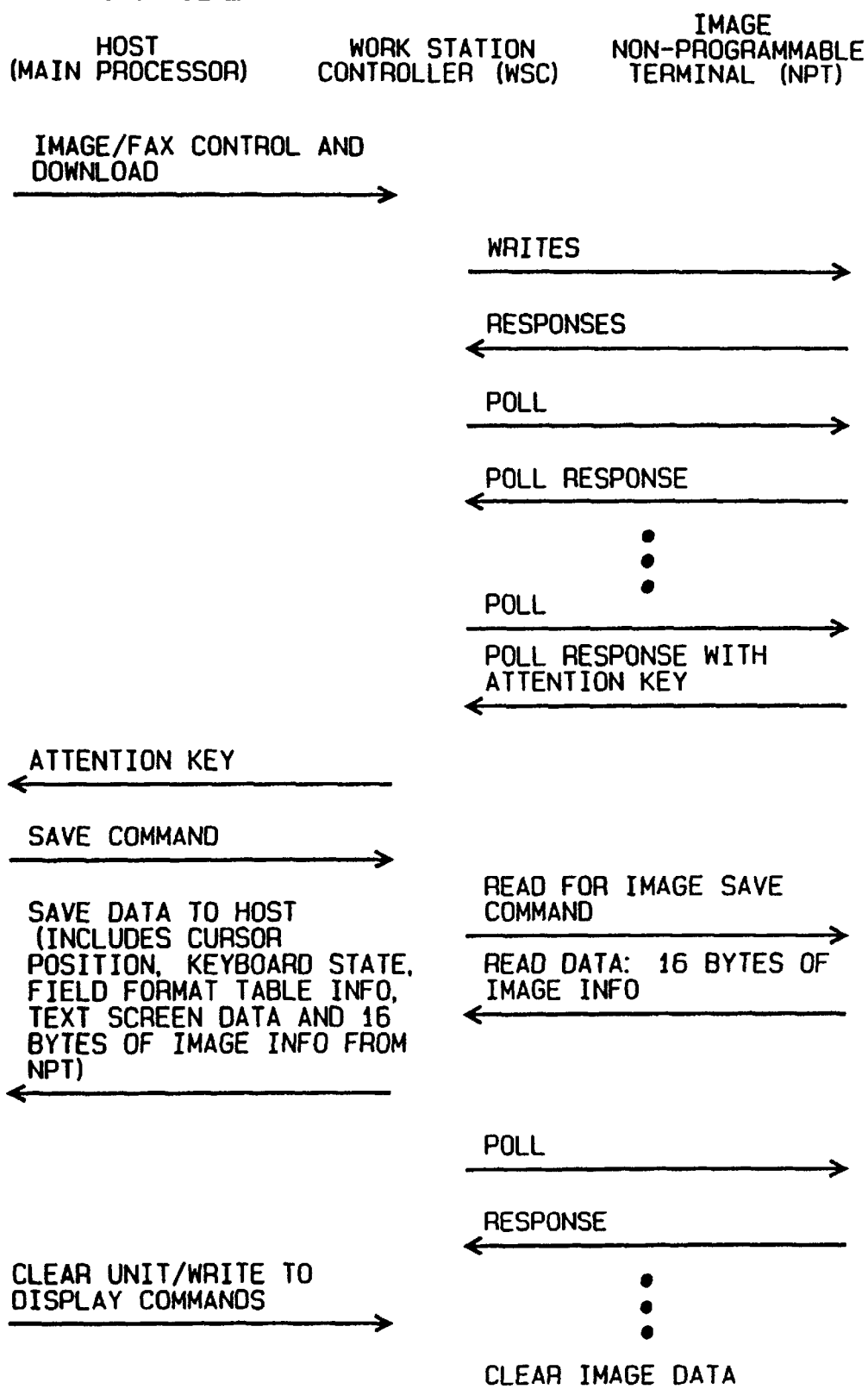

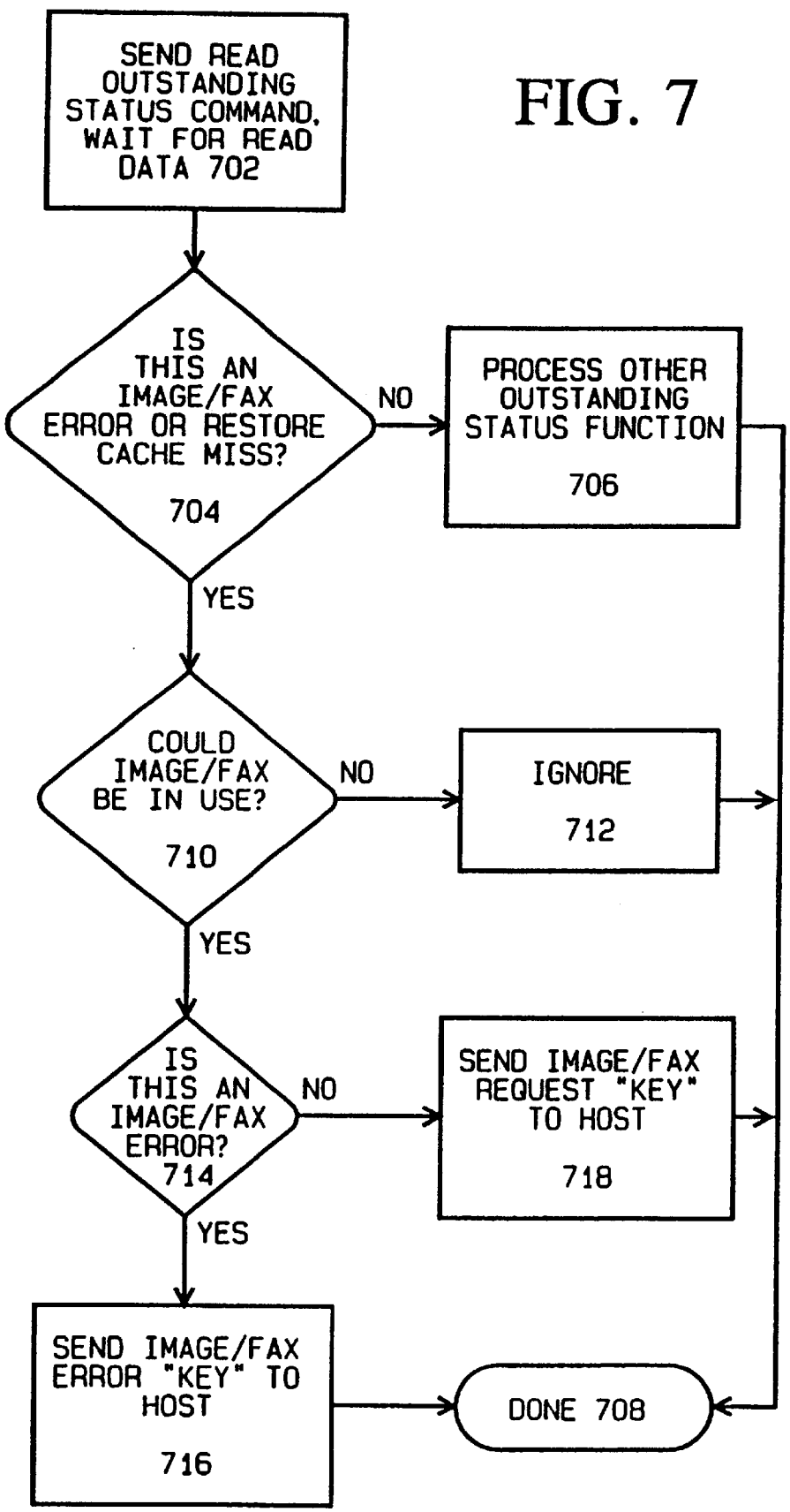

METHOD AND APPARATUS FOR BACKGROUND AND FOREGROUND COLOR CONTROL OF IMAGE AND FACSIMILE DATA DISPLAY ON A NON-PROGRAMMABLE-TERMINAL

RELATED APPLICATION

This is a continuation-in-part of co-pending U.S. patent application Ser. No. 08/261,321 filed Jun. 16, 1994.

BACKGROUND OF THE INVENTION

1. Field of the Invention

The present invention relates to a method and apparatus for displaying image and facsimile data on a non-programmable-terminal (NPT) attached to a host computer for host-based applications, and more particularly to both user set-up and host-based application control of background and foreground color of an image and facsimile data display on a NPT.

2. Description of the Prior Art

Known implementations for displaying image and facsimile (fax) data require a programmable work station (PWS) as the presentation device. A PWS is a work station capable of running local PWS applications. The PWS solution is relatively expensive and requires significant support.

Non-programmable-terminals (NPTs) are significantly less expensive than the PWS; however, known NPTs do not support the display image or facsimile data. Typically NPTs are non-graphical, character-based terminals. NPTs are attached to a host computer, such as an IBM AS/400, via a twinaxial cable. The NPTs require the support of a workstation controller (WSC) for keystroke handling, screen/field management, and the like. Known NPTs display alphanumeric text of host-based applications.

A need exists for integrating the display of image and fax data into the existing style of host-based applications and to eliminate the exclusive need for a programmable work station for displaying image and fax data. It is highly desirable to provide both host application and user control of the background and foreground color of an image and facsimile data display on a NPT. With a bi-level monochrome viewing, typically an image has white background and black foreground. It is desirable to provide user control of the background and foreground color of a display with a bi-level monochrome image implementation to enable user selected contrast image contrast. Also it is desirable to provide application control of the background and foreground color of a display to convey additional information to the end user with the use of color.

SUMMARY OF THE INVENTION

It is a principal object of the present invention to provide a method and apparatus for displaying image and facsimile data on a non-programmable-terminal (NPT) attached to a host computer and for controlling foreground and background color of the displayed image and facsimile data. Other important objects of the present invention are to provide a method and apparatus enabling a host-based application display of image and facsimile data, to provide such method and apparatus capable of efficient and effective operation and that overcomes many of the disadvantages of prior art arrangements.

In brief, the objects and advantages of the present invention are achieved by a method and apparatus for displaying image and facsimile data on a host-based application display. A host computer generates control and download command data for displaying the image or facsimile data. The image and facsimile data are processed by a non-programmable-terminal (NPT) or a programmable work station (PWS) for presentation of a display screen. When a user requests another function, the NPT or PWS stores image information and sends save image information to the host computer. The save image information includes cache image counter data, scaling and viewed image screen location data that is used to restore the displayed image and facsimile data when the user returns to the previous function. Both the user and host application can specify a foreground color and a background color for the image and facsimile data display.

BRIEF DESCRIPTION OF THE DRAWING

The present invention, together with the above and other objects and advantages, can best be understood from the following detailed description of the embodiment of the invention illustrated in the drawing, wherein:

FIG. 2 is a timing diagram illustrating sequential commands between a workstation controller (WSC) and an image non-programmable-terminal (NPT) and a host processor of FIG. 1 for bring-up;

FIGS. 4A and 4B together provide a save/restore timing sequence between a host processor, a workstation controller (WSC) and a non-programmable-terminal (NPT) of FIG. 1;

FIG. 7 is a flow chart illustrating the sequential steps for WSC processing of outstanding status on poll response in accordance with the method of the present invention;

DETAILED DESCRIPTION OF THE PREFERRED EMBODIMENTS

Figure 1:
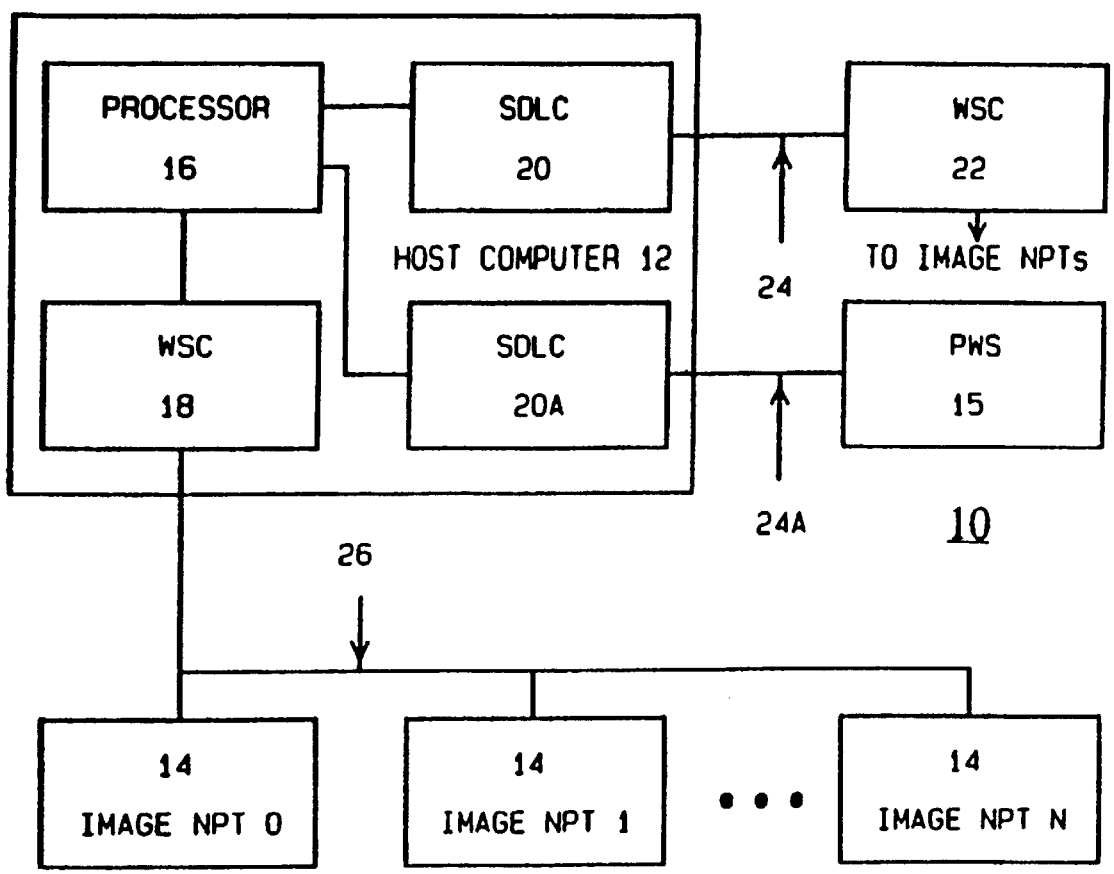
FIG. 1 is a block diagram representation of a computer or data processing system embodying the present invention.
Figure 1A:
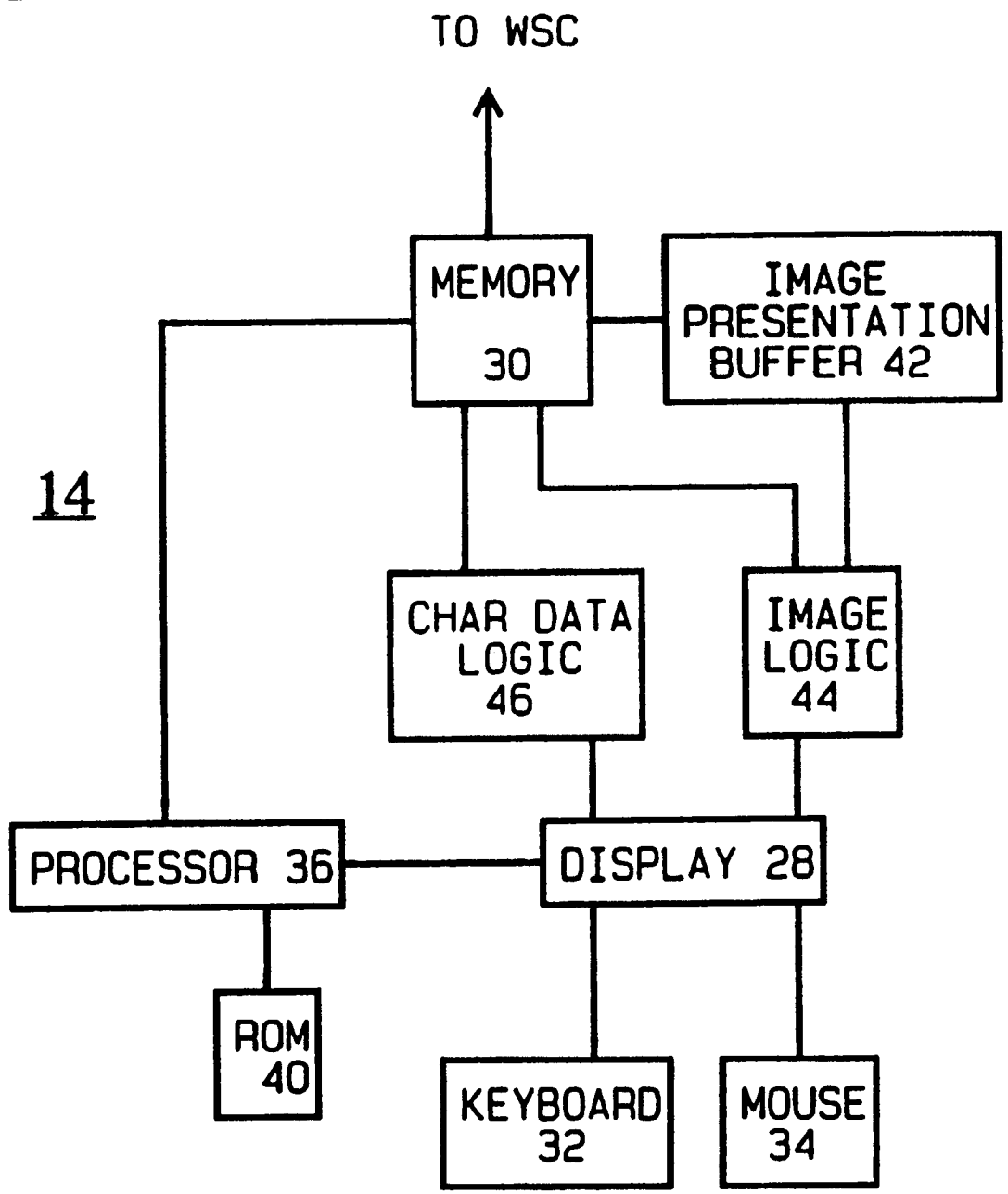
FIG. 1A is a block diagram illustrating a non-programmable-terminal of FIG. 1.

Referring now to the drawing, FIGS. 1 and 1A together show a block diagram of computer system 10 of the invention. Computer system 10 is illustrated in simplified form sufficient for an understanding of the present invention because the utility of the present invention is not limited to details of a particular system. Computer system 10 includes a host computer 12, a plurality of image non-programmable-terminals (NPTs) 14 and an optional programmable work station (PWS) emulator 15.

Host computer 12 contains a processor 16 connected to at least one work station controller (WSC) 18. An optional synchronous data line controller (SDLC) 20 is used with a remote WSC 22 connected via an SDLC link 24, or other communications protocol can be used with the remote WSC 22. A second SDLC 20A is used with the PWS emulator 15 via a second SDLC link 24A. WSC 18 or 22 is connected via a multidrop, daily-chained twinaxial cable 26 to the terminals 14. Image NPTs 14 attached to a local WSC 18 or a remote WSC 22 are identical devices. Image NPT 14 supports the display of alphanumeric text and images and facsimile (fax) data. WSC 18 or 22 supports multiple NPTs 14, for example, 40 NPTs across a 1 MBit twinaxial communications cable 26.

Having reference to FIG. 1A, image NPTs 14 include a display 28, a memory 30, an external keyboard 32 and an optional external mouse 34. Memory 30 includes a communication buffer, for example, 2K bytes, for communicating with the WSC 18, a test display screen data buffer, for example, 3.6K bytes, a source image buffer or cache, for example, 128K bytes, for storing compressed image data, a foreground color register and a background color register for an image and facsimile (image/fax) data display, for example, 3 bytes for each color, and assorted storage area. Image NPT 14 also includes a processor 36, such as microprocessor device type 80286 or 80386 manufactured and sold by Intel Corp. of Santa Clara, Calif. Associated memory includes a read only memory (ROM) 40. ROM 40 stores all the microcode for the image NPT 14. An image presentation buffer 42, preferably a high-speed RAM, stores decompressed image data. For example, the capacity of image presentation buffer 42 can be 256K bytes, providing image/fax viewing capability of picture elements (pels) 1024×2048 or 2048×1024, depending on the shape of the image/fax data. An image logic block 44 is coupled between the image presentation buffer 42 and display 28 for processing image data. A character data logic block 46 is coupled between memory 30 and display 28 for processing character data. Image NPT 14 can be an integrated unit including the display 28, memory 30 and processor 36 in a single housing. Alternatively, image NPT 14 can have a modular arrangement with a separate personal-computer type monitor for the display 28.

Various commercially available devices can be used in computer system 10. For example, host computer 12 can be the Application System (AS/400) manufactured by International Business Machines Corporation of Armonk, N.Y. or provided in conjunction with a number of mainframe computers. The image NPT 14 can be provided with an IBM 5250 non-programmable display terminal enhanced to include the source image buffer contained within memory 30, the image presentation buffer 42 and image logic block 44 and suitable microcode in ROM 40 for displaying image and facsimile data and including foreground and background color control as illustrated and described below. WSC 18 can be an IBM Workstation I/O Processor, Type 6050 or a remote 5494 workstation controller enhanced for displaying image and facsimile data. FWS 15 can be implemented by various commercially available devices, such as a personal computer with suitable programs to emulate the combination of a WSC 13 and an attached NPT 14 to run host-based applications programs.

Advantages and features of the invention are that displaying of image and fax data is enabled on a relatively low-cost image NPT 14, and the display of image and fax data is integrated into existing styles of host-based applications. The present invention eliminates the exclusive need for a PWS to support display of image or fax for host-based applications. Also the present invention enables host-based applications to present images on a low-cost, character-bused image NPT 14. For optimized performance, image NPT 14 includes a decomposition code and decompresses the image/fax data into the image presentation buffer 42 while image/fax data is being received in the source image buffer of memory 30. The present invention enables both user and application programmer control of foreground and background color the display area or viewport for the image/fax data.

Image NPT 14 is not capable of running local applications as is a PWS. Image NPT 14 receives new commands across the twinaxial communication cable using twinaxial communication protocol, such as write image or fax data and remove image or fax, in accordance with the invention. Host processor 16 sends 5250 image/fax data stream control and download commands to create an image or fax with data including row/column location on the display screen, rows/columns in the image region, vertical and horizontal scrolling information. Image NPT 14 presents the image/fax information to the user and enables both user and application programmer control of image/fax viewport foreground and background color.

PWS 15 supports the 5250 image/fax data stream extensions and allows a PWS user to run the host-based image/fax applications. PWS 15 can run PWS applications and host-based applications. The host-based application typically runs within one window on the PWS. Host processor 16 determines the location, size, window movement and sizing allowed for displaying the image and fax. PWS 15 presents the image/fax information to the user and enables both user and application programmer control of image/fax viewport foreground and background color.

Having reference to FIG. 2, there is shown a timing diagram illustrating sequential commands between a workstation controller 18, an image non-programmable-terminal 14 and a host processor 16 for bring-up. WSC 18 polls all unused addresses, upon power-up NPT 14 sends a poll response. WSC 18 sends read information commands and NPT 14 sends read information responses, for example, with read data indicating image/fax is supported. WSC 18 then sends read image/fax information command and NPT sends appropriate read data including supported image formats and scaling granularity. WSC 18 then sends an NPT power up command to the host processor 16. Next WSC 18 sends polls and NPT 14 sends poll responses. Host processor sends a query command to WSC 18 and WSC 18 sends a query reply including image/fax information received from the NPT as described above, screen size of display 28 and color capability. WSC 18 processing continues with sending polls and NPT 14 sending poll responses.

Figure 3:
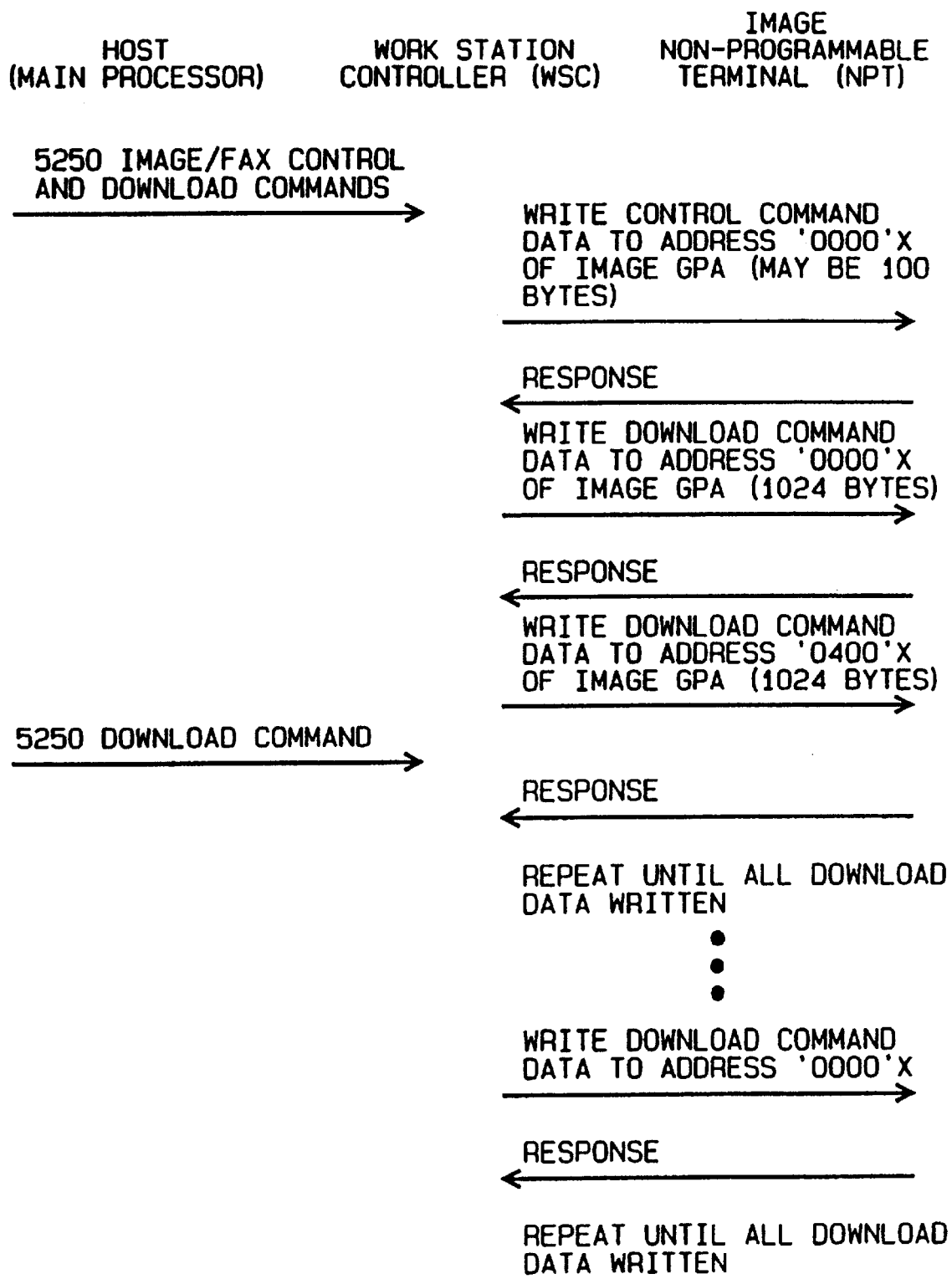
FIG. 3 is an image download timing sequence between a host processor, a workstation controller (WSC) and an image non-programmable terminal (NPT) of FIG. 1 with 15K bytes of image data.

Having reference to FIG. 3, there is shown an image download timing diagram illustrating sequential commands between a host processor 16, a workstation controller 18 and an image non-programmable-terminal 14. Initially host processor 16 sends 5250 image/fax control and download data stream commands to the WSC 18. Then WSC 18 writes control command data to address '0000'x of the image NPT general purpose address (GPA), for example, including 100 bytes of control command data. Then image NPT 14 sends a response to WSC 18. Next WSC 18 writes download command data to address '0000'x of image GPA, for example, including 1024 bytes of download command data. Then image NPT 14 sends a response to WSC 18. Image NPT 14 begins decompressing and presenting the image data when the first 1024 bytes is received in the source image buffer of memory 30. The control command indicates where the image is to be placed on the display screen (row and column), size (row and column), foreground and background color, scale and initial view image location. WSC 18 writes download command data to address '0400'x of image GPA, for example, including the next 1024 bytes of download command data. This is repeated until all download command data has been written to the NPT 14. A predetermined maximum size of these writes can be, for example, 10,200 bytes (based upon the maximum host to WSC frame size), where the address of image GPA is increased after each successful write. After sending the first data stream download command, host processor sends another 5250 download command to the WSC 18. WSC 18 continues writing download command data to the image NPT 14 and image NPT 14 sends responses until all the download data is written.

Figure 4B:
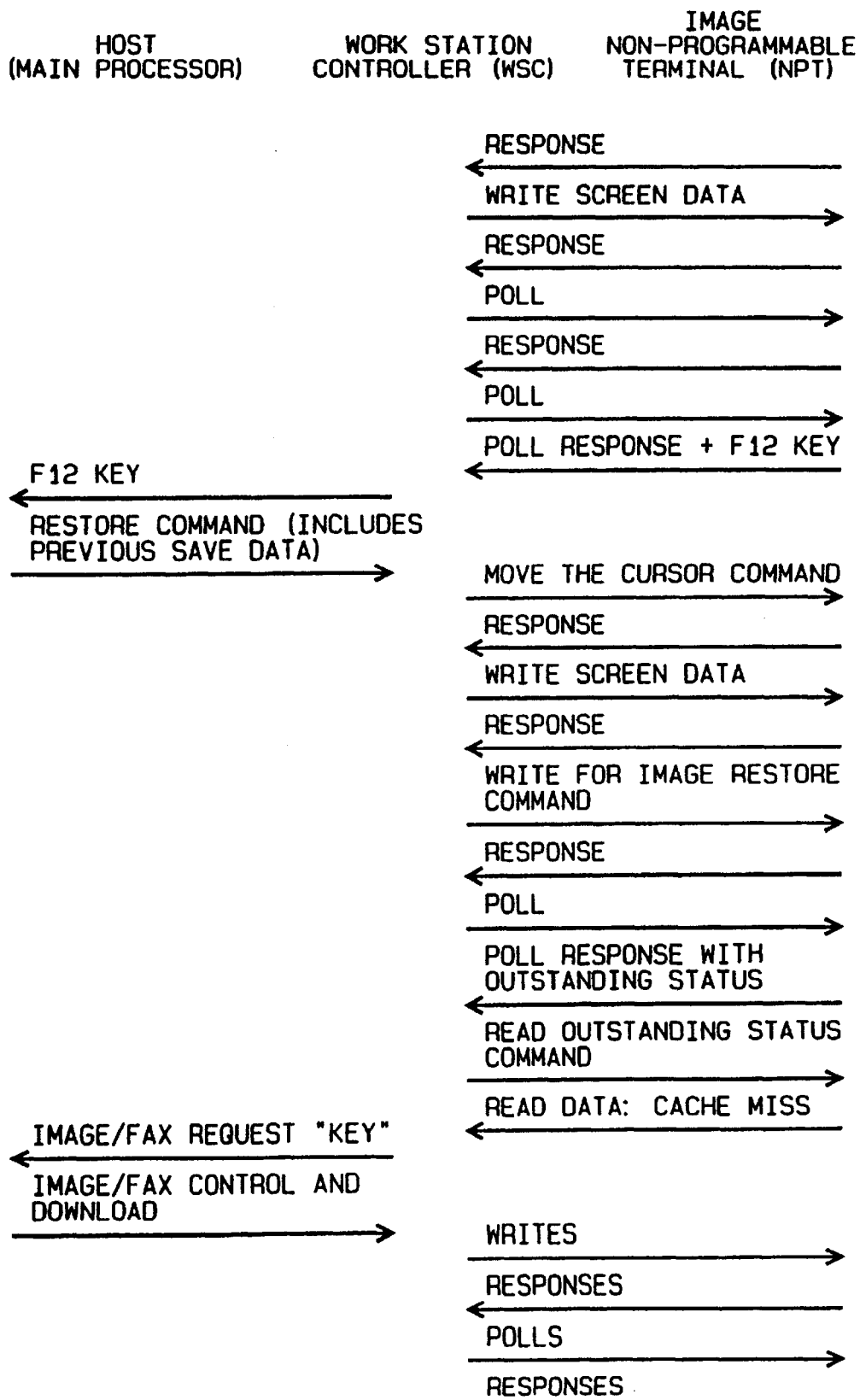

Having reference to FIGS. 4A and 4B, there is shown a save/restore command timing sequence between the host processor 16, WSC 18 and image NPT 14. Host processor 16 sends image/fax control and download commands to the WSC 18. WSC 18 writes twinaxial control and download commands to NPT 14 and NPT 14 sends responses until all the download data is written. WSC 18 polls the NPT 14 and NPT 14 sends poll responses. NPT 14 sends a poll response with attention key as a result of a user keystroke. WSC 18 sends the attention key command to the host processor 16. Then host processor 16 sends a data stream save command to WSC 18. In response, WSC 18 sends a read for image save command to the NPT 14. NPT 14 sends read data including sixteen bytes of image information that provides cache data (two byte image counter where '0000'x indicates no image on the display screen), scaling and viewed image screen location. WSC 18 sends save data to host processor 16 including cursor position, keyboard state, field format table information (entry field locations and sizes), text screen data and the sixteen bytes of image information from NPT 14. WSC 18 sends twinaxial polls and NPT 14 sends poll responses. Host processor sends clear unit/write to display commands to clear the entire display screen including image data on display screen 28. WSC 18 then sends a twinaxial clear image data command. The image is erased from the display screen but will remain in cache memory when the application defines the image as cacheable in the control command.

Referring to FIG. 4B, NPT 14 sends a response to WSC 18. WSC 18 writes screen data to the NPT 14 and NPT 14 sends a response. WSC 18 sends twinaxial polls and NPT 14 sends poll responses while the user does other work with new display screens. When the user completes the other work, the user presses a cancel function screen, for example, the F12 function key. NPT 14 sends a poll response with the F12 key to WSC 18. WSC 18 sends the F12 key to the host processor 16. Host processor 16 sends a data stream restore command including the previously saved data (unchanged by host processor 16). WSC 18 sends a twinaxial move the cursor command to NPT 14 to recreate the previous cursor position and NPT 14 sends a response. WSC 18 writes screen data and NPT 14 sends a response. WSC 18 writes an image restore command including the sixteen bytes previously read from the NPT and NPT 14 sends a response. WSC 18 sends a poll and NPT 14 sends a poll response with optional outstanding status. If a cache hit occurred, NPT 14 does not indicate outstanding status. NPT 14 indicates outstanding status when a cache miss occurred. NPT 14 determines if a cache hit or cache miss occurred. A cache hit occurs if the two byte number from the sixteen bytes matches as image/fax counter in NPT 14 and when the image/fax was defined as cacheable. A cache miss occurs if the two byte number from the sixteen bytes is different than the image/fax counter in NPT 14 or when the image/fax was not defined as cacheable. WSC 18 sends a read outstanding status command to the NPT 14. As shown, NPT 14 sends read data including a cache miss. WSC 18 sends an image/fax request "key" as a pseudo-keystroke to the host processor 16. Host processor 16 sends image/fax control and download commands to the WSC 18 to recreate the image on the display screen. WSC 18 writes twinaxial control and download commands to NPT 14 and NPT 14 sends responses until all the download data is written.

Figure 5A:
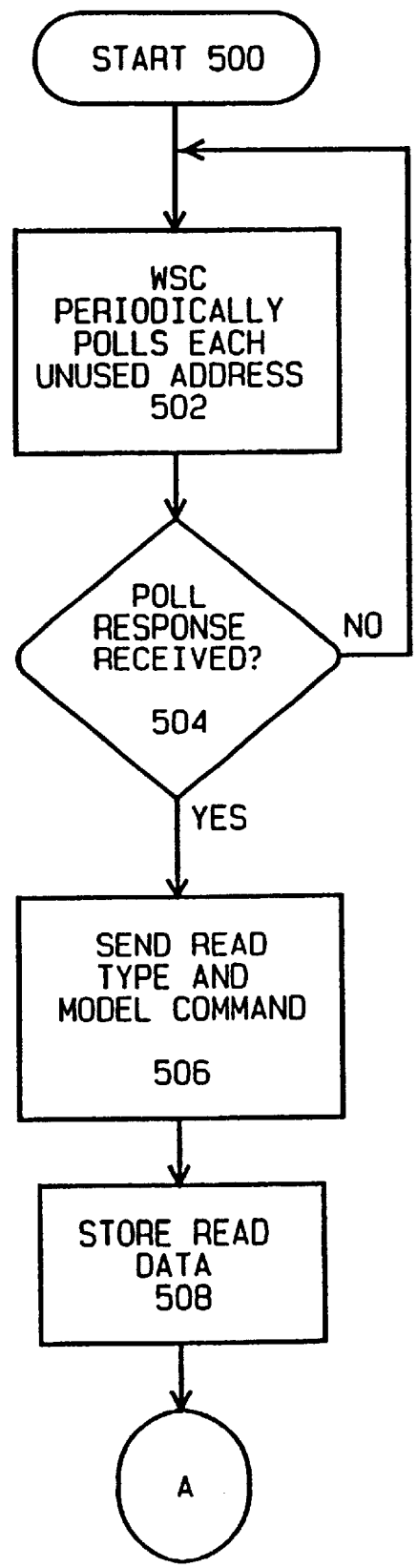
FIGS. 5A and 5B together provide a flow chart illustrating the sequential steps for WSC processing bring-up in accordance with the method of the present invention.
Figure 5B:
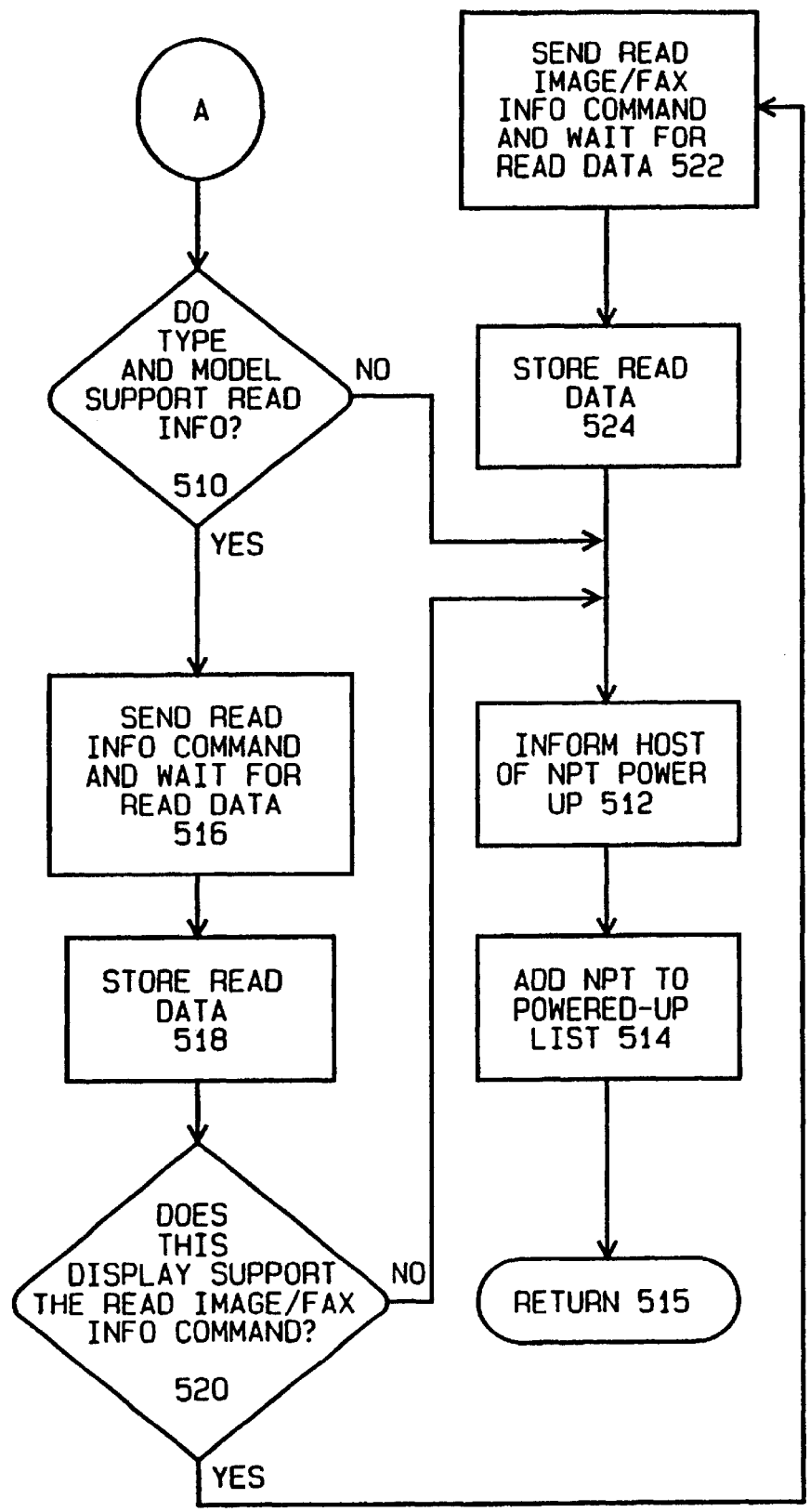

Referring to FIGS. 5A and 5B, there is shown a flow chart illustrating the sequential steps for WSC bring-up processing. Sequential operations begin at block 500. WSC 18 periodically polls each unused address as indicated at a block 502. WSC 18 checks whether a poll response was received as indicated at a decision block 504. When a poll response is not received at block 504, the operation returns to periodically poll each unused address. When a poll response is received, then WSC 18 sends a twinaxial read type and model command to NPT 14 as indicated at a block 506. WSC 18 waits for the data and then stores the read data as indicated at a block 508.

Referring to FIG. 5B, WSC 18 determines whether the type and model of NPT 14 supports read information as indicated at a decision block 510. If the NPT 14 does not support the read information command, WSC 18 informs the host processor 16 of NPT power-up as indicated at a block 512. WSC 18 adds NPT 14 to the powered-up list as indicated at a block 514 and returns as indicated at a block 515 to periodically poll each unused address. If the NPT 14 supports the read information command, WSC 18 sends a read information command and waits for read data from NPT 14 as indicated at a block 516. Then WSC 18 stores read data as indicated at a block 518. Next WSC 18 checks whether NPT 14 supports the read image/fax information command as indicated at a decision block 520. If the read image/fax information command is not supported by NPT 14, then the WSC 18 informs the host processor 16 of NPT power-up as indicated at a block 512. Then WSC 18 adds NPT 14 to the powered-up list as indicated at a block 514 and returns as indicated at a block 515 to periodically poll each unused address. If the read image/fax information command is supported by NPT 14, WSC 18 sends a read image/fax information command and waits for read data as indicated at a block 522. WSC 18 stores the read data as indicated at a block 524. Then WSC 18 informs the host processor 16 of NPT power-up as indicated at a block 512. WSC 18 adds NPT 14 to the powered-up list as indicated at a block 514 and returns as indicated at a block 515 to periodically poll each unused address.

FIGS. 6A, 6B, 6C, 6D and 6E together provide a flow chart illustrating the sequential steps for WSC processing of host data stream commands. The sequential WSC processing steps start as indicated at a block 600. WSC 18 determines whether there is another data stream command to process as indicated at a decision block 602. When there is a data stream command from the host processor 16 to process, WSC 18 checks whether the data stream command is a clear unit command as indicated at a decision block 604. When a clear unit command is identified, WSC 18 writes nulls to a screen buffer in WSC's memory as indicated at a block 606 to initialize the display screen. Next WSC 18 clears the field format table in the WSC's memory as indicated at a block 608. WSC 18 checks whether an image/fax could be in use as indicated at a decision block 610. When an image/fax could be in use in decision block 610, then WSC 18 sends a clear image/fax data command to NPT 14 and waits for response as indicated at a block 612. WSC 18 resets an image/fax in use flag as indicated at a block 614 and the sequential process returns as indicated at a block 616 to check for another data stream command to process at the block 602. When an image/fax is not in use in decision block 610, the sequential process returns to check for another data stream command to process at block 602.

Figure 6A:
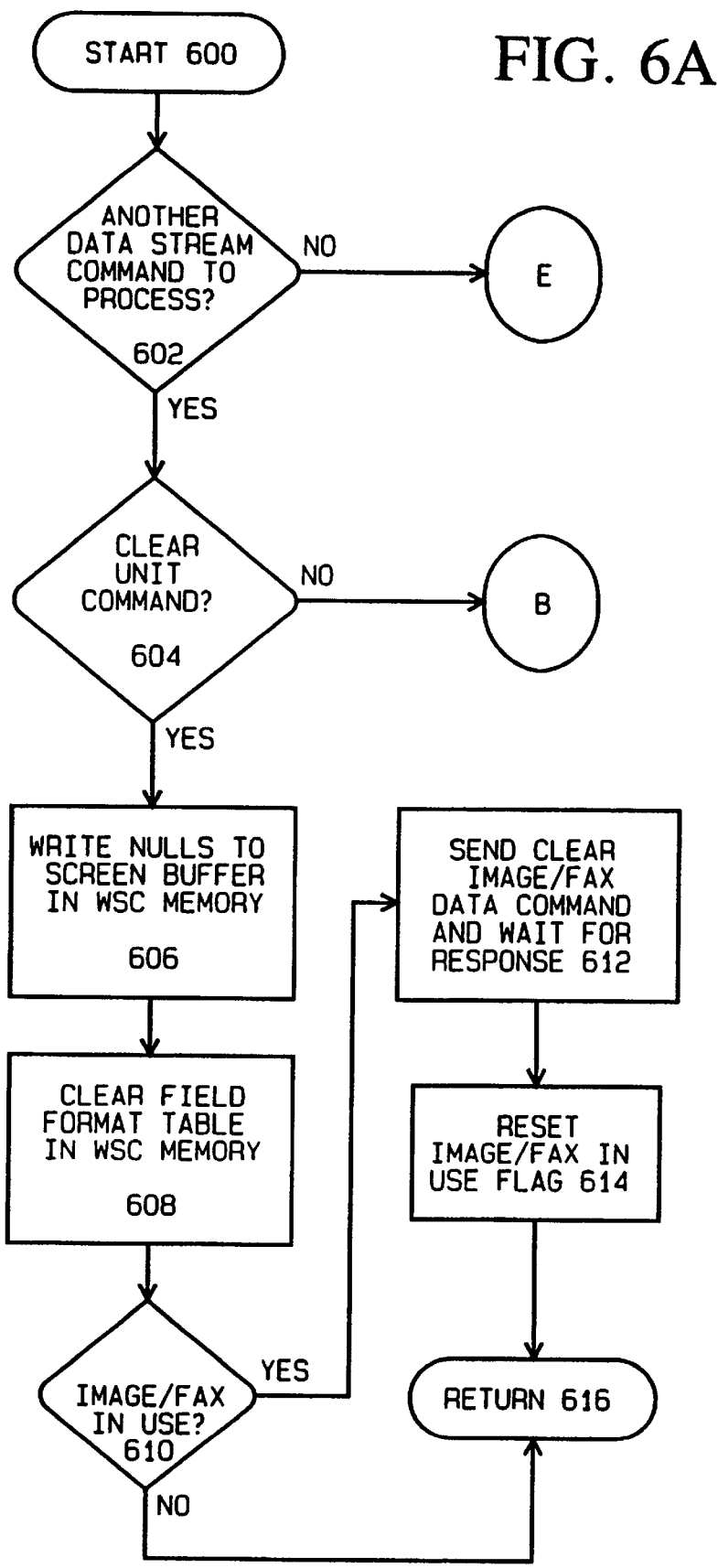
FIGS. 6A, 6B, 6C, 6D and 6E together provide a flow chart illustrating the sequential steps for WSC processing of host data stream command including data processing of save and restore data stream commands in accordance with the method of the present invention.
Figure 6E:
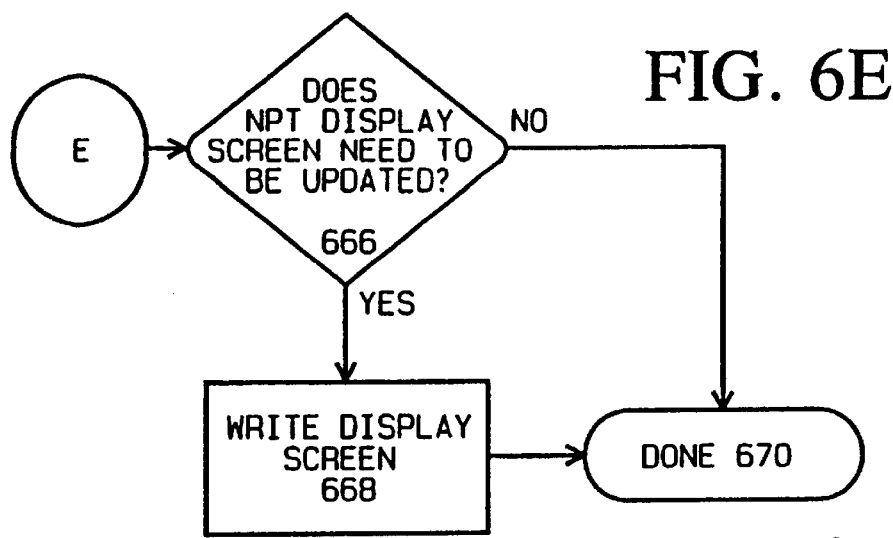
Figure 6B:
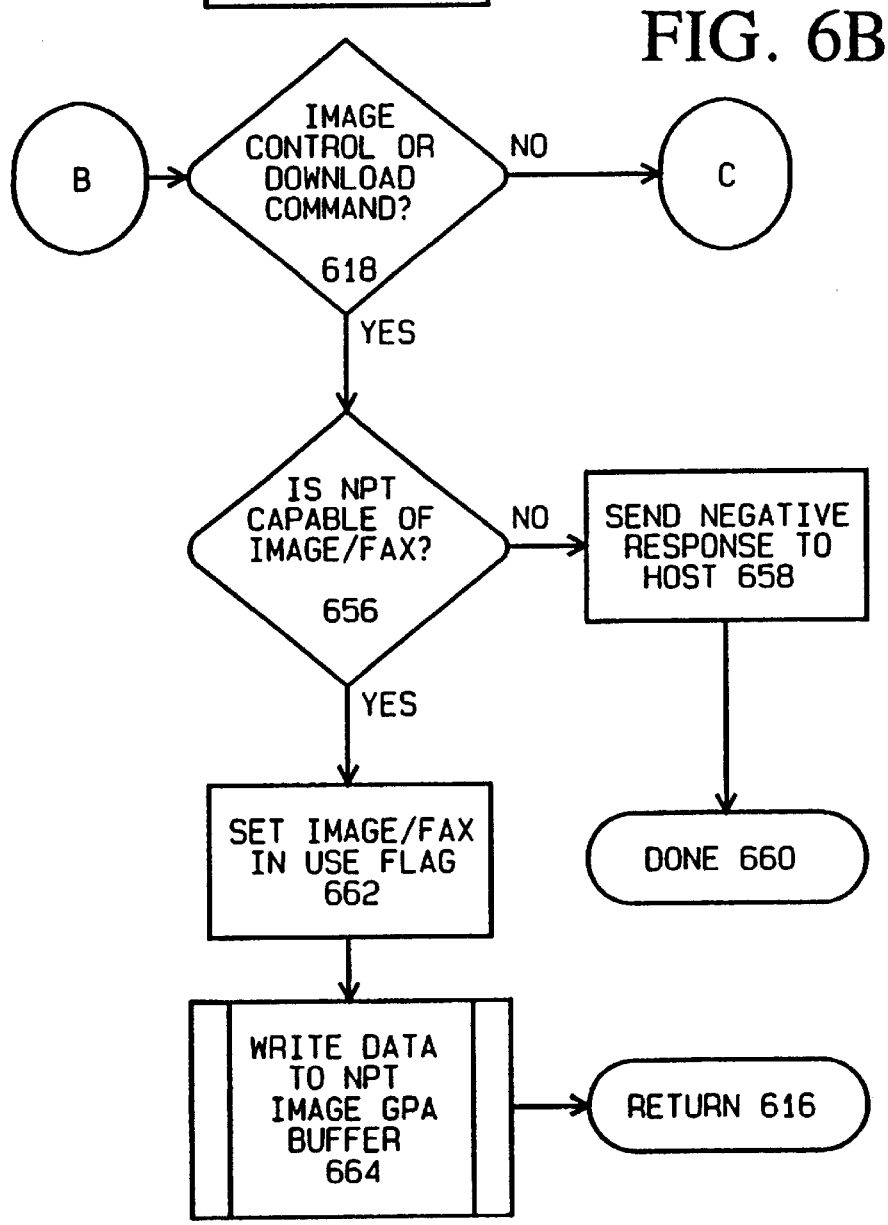
Figure 6C:
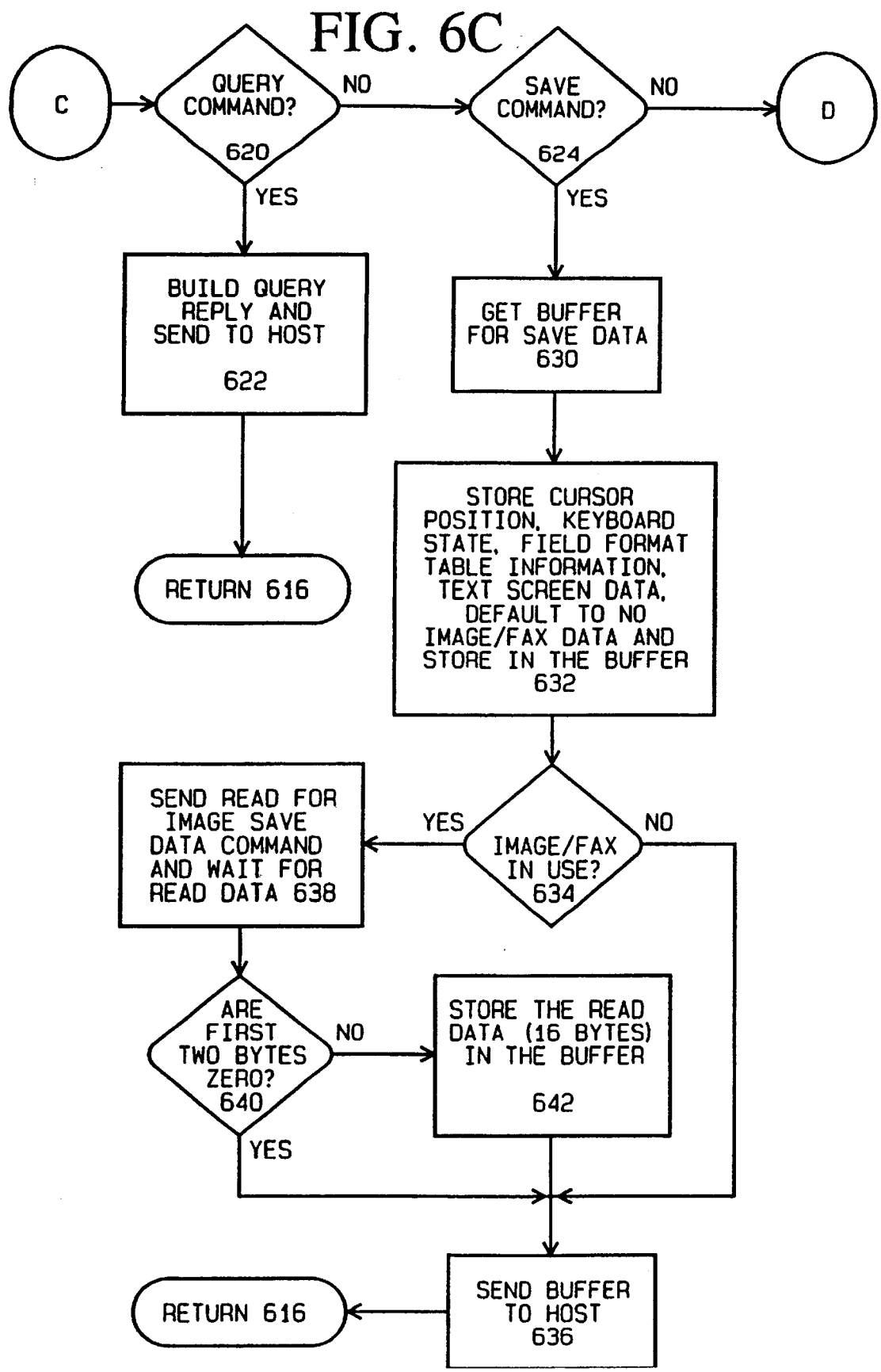

Referring also to FIGS. 6A, 6B, 6C and 6D, when a clear unit command is not identified at block 604 in FIG. 6A, WSC 18 determines whether the data stream command is either an image control or download command as indicated at a decision block 618 in FIG. 6B. When an image control or download command is not identified at decision block 618, WSC 18 checks for a query command as indicated at a decision block 620 in FIG. 6C. When a query command is identified, WSC 18 builds a query reply and sends the query reply to host processor 16 as indicated at a block 622. This includes information on the NPT image capability (image formats and scaling). Then the sequential process returns as indicated at a block 616 to check for another data stream command to process at the block 602. Otherwise, when a query command is not identified at decision block 620, then WSC 18 checks for a save command as indicated at a decision block 624. When a save command is not identified at decision block 624, then WSC 18 checks for a restore command as indicated at a decision block 626 in FIG. 6D. If not a restore command, then WSC 18 processes other commands as indicated at a block 628, for example, a write to display command by writing text to the display screen or defining entry fields. Then the sequential process returns as indicated at a block 616 to check for another data stream command to process at the block 602.

Referring again to FIG. 6C, when a save command is identified at decision block 624, then WSC 18 gets a buffer for save data as indicated at a block 630. WSC 18 stores cursor position, keyboard state, field format table information, text screen data, default to no image/fax data in the buffer as indicated at a block 632, for example, storing 3K bytes in WSC's memory. Then WSC 18 checks whether image/fax could be in use as indicated at a decision block 634. If determined that image/fax is not in use, then WSC 18 sends the buffer data to host processor 16 as indicated at a block 636 and returns as indicated at a block 616 to check for another data stream command to process at the block 602. Otherwise, when determined that the image/fax could be in use at block 634, WSC 18 sends a twinaxial read for image save data command to WPT 14 and waits for read data as indicated at a block 638. WSC 18 then checks the first two bytes of the sixteen bytes to determine if the first two bytes are zero as indicated at a decision block 640. When the first two bytes are not zero, WSC 18 stores the sixteen bytes of read data in the buffer as indicated at a block 642. After storing or when the first two bytes are zero, then WSC 18 sends the buffer data to host processor 16 at block 636. A zero value indicates no image is on the display screen, a non-zero value is an image counter. Then the sequential process returns as indicated at a block 616 to check for another data stream connected to process at the block 602.

Figure 6D:
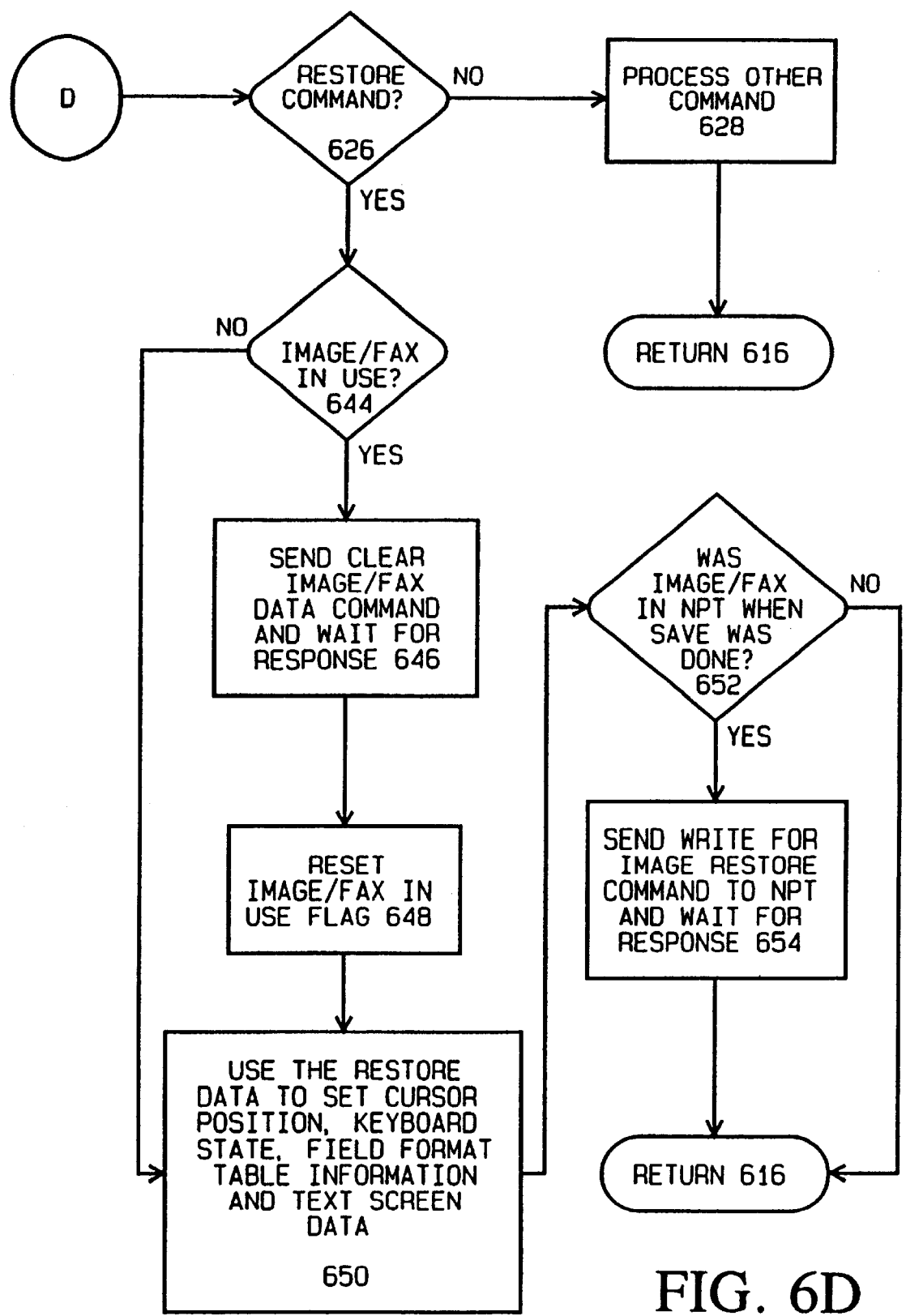

When a restore command is identified at decision block 626 in FIG. 6D, WSC 18 checks whether image/fax could be in use as indicated at a decision block 644. When determined image/fax could be in use at block 644, then WSC 18 sends a clear image/fax data command to NPT 14 and waits for a response as indicated at a block 646. Then WSC 18 resets the image/fax in use flag as indicated at a block 648. When determined image/fax could be in use at block 644, WSC 18 uses the restore data to set cursor position, keyboard state, field format table information and text screen data as indicated at a block 650. Next WSC 18 checks whether the image/fax was in NPT 14 when save was done as indicated at a decision block 652. If yes, then WSC 18 sends a write for image restore command to NPT 14 (the same sixteen bytes read previously from the NPT) and waits for response as indicated at a block 654. Then the sequential process returns as indicated at a block 616 to check for another data stream command to process at the block 602. When determined that the image/fax is not in use at decision block 644, WSC 18 uses the restore data to set cursor position, keyboard state, field format table information and text screen data as indicated at a block 650.

Referring again to FIG. 6B, when WSC 18 identifies a data stream image control or download command at decision block 618, then WSC 18 checks if the NPT 14 is capable of supporting image/fax as indicated at a decision block 656. When determined that the NPT 14 is not capable of supporting image/fax, WSC 18 sends a negative response to host processor 16 as indicated at a block 658 to complete the sequence as indicated at a block 660. When determined that the NPT 14 is capable of supporting image/fax, WSC 18 sets the image/fax in use flag as indicated at a block 662. Then WSC 18 performs a subroutine to write data to NPT image GPA buffer as indicated at a block 664. When the download data is greater than 1024 bytes, then WSC 18 uses multiple writes. WSC 18 first writes to the address '0000'x of the image NPT's GPA, and waits for a response, then increments by 1024 on subsequent writes. Then the sequential process returns as indicated at a block 616 to check for another data stream command to process at the block 602.

Referring again to FIGS. 6A and 6E, when WSC 18 does not identify another data stream to process at block 602 in FIG. 6A, WSC 18 checks whether the NPT display screen needs to be updated as indicated at a decision block 666 in FIG. 6E. If updating is needed, then WSC 18 writes update data to the display screen as indicated at a block 668. Writing to the display screen and when updating is not needed completes the sequence as indicated at a block 670.

FIG. 7 is a flow chart illustrating the sequential steps of WSC processing of outstanding status on poll response. First WSC 18 sends a twinaxial read outstanding status command to NPT 14 and waits for read data as indicated at a block 702. Then WSC 18 checks whether this an image/fax error or restore cache miss as indicated at a decision block 704. If not an image/fax error or restore cache miss, then WSC 18 processes other outstanding status functions as indicated at a block 706. This completes the sequential steps as indicated at a block 708. When an image/fax error or restore cache miss is identified at decision block 704, then WSC 18 checks whether the image/fax could be in use as indicated at a decision block 710. If not, then WSC 18 ignores the read data as indicated at a block 712. This completes the sequential steps as indicated at a block 708. When determined that the image/fax could be in use at decision block 710, WSC 18 checks if this an image/fax error as indicated at a decision block 714. If an image/fax error is identified, then WSC 18 sends an image/fax error "key" to host processor 16 as indicated at a block 716. If an image/fax error is not identified, then WSC 18 sends an image/fax request "key" to host as indicated at a block 718. This completes the sequential stage as indicated at a block 708. Save and restore support is an important feature of host computer system 12. Conventionally save data associated with save and restore processing always contained all of the necessary information to recreate the display screen at a later time (restore). With image and fax data being much larger than character data, the conventional save and restore processing would be very undesirable. With the present invention, the save data includes a small amount of information on the image and fax data including an image counter, current scale and current viewed image location. With features of invention such as read to image save, write to image restore, outstanding status cache miss and image/fax request cache key, save and restore continue to function correctly. In typical situations, a cache hit occurs and performance is optimized.

FIGS. 8A, 8B, 8C, 8D, 8E and 8F together provide a flow chart illustrating the sequential steps for NPT processing twinaxial commands and polls. NPT processing of commands and polls is done on interrupt level. NPT 14 begins with monitoring for a poll as indicated at a decision block 802. When a poll is identified, NPT 14 checks whether an event or keystroke is queued as indicated at a decision block 804. When an event or keystroke is queued, NPT 14 sends a poll response with the keystroke or outstanding status as indicated at a block 806. When an event or keystroke is not queued, NPT 14 sends an empty poll response as indicated at a block 808. This completes the sequential steps as indicated at a block 810. If a poll is not identified at decision block 802, then NPT 14 checks whether this is a read type/model, read info, or read image/fax info command as indicated at a decision block 812. If yes, then NPT 14 returns the appropriate read data as indicated at a block 814 and completes the sequential steps as indicated at a block 810. Otherwise, NPT 14 checks whether this is a read outstanding status command as indicated at a decision block 816. If a read outstanding status command is identified at block 816, then NPT 14 returns read data of outstanding status data as indicated at a block 818 and the sequential steps are completed as indicated at a block 810.

Figure 8A:
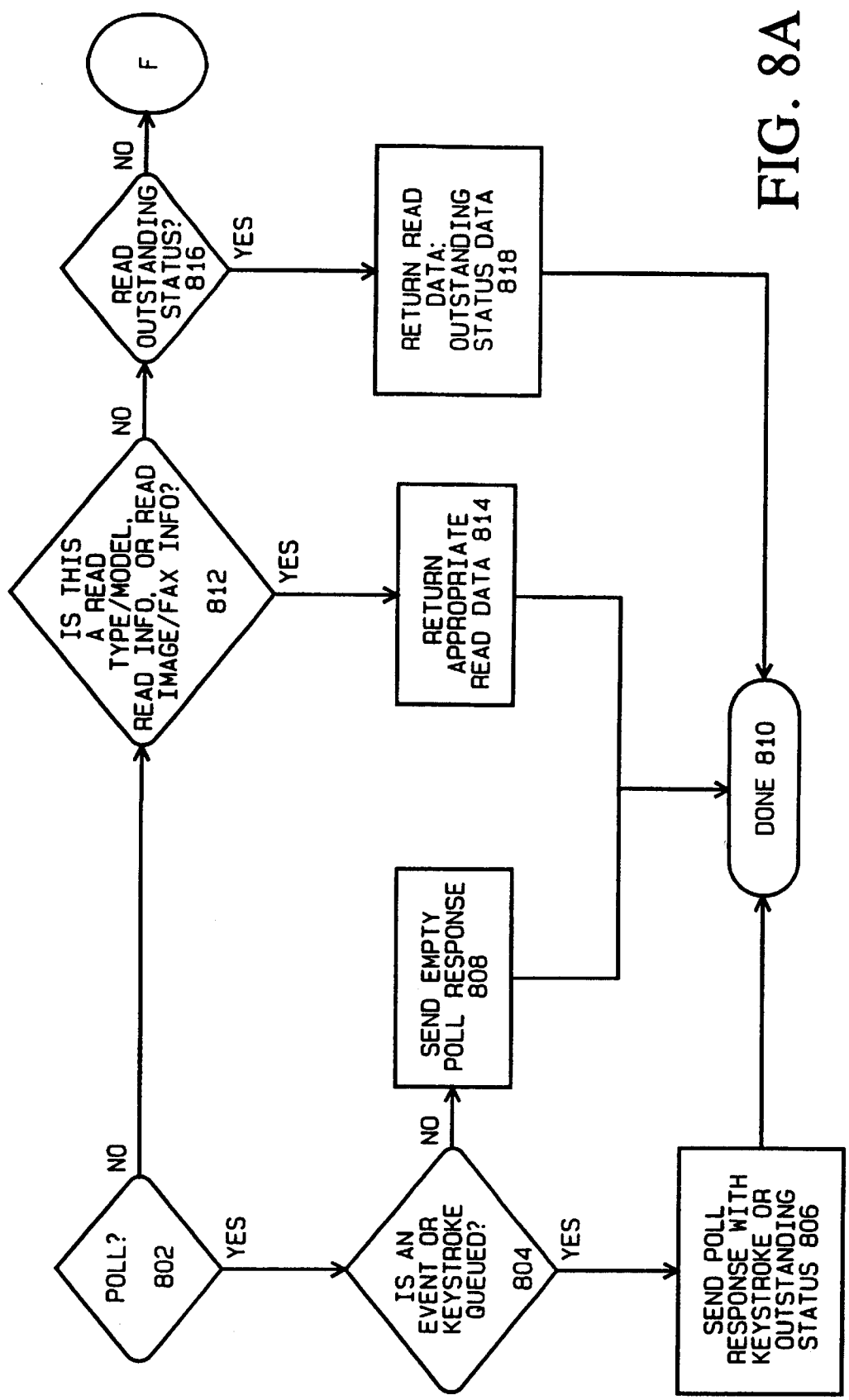
FIGS. 8A, 8B, 8C, 8D, 8E and 8F together provide a flow chart illustrating the sequential steps for NPT processing of twinaxial commands and polls in accordance with the method of the present invention.
Figure 8B:
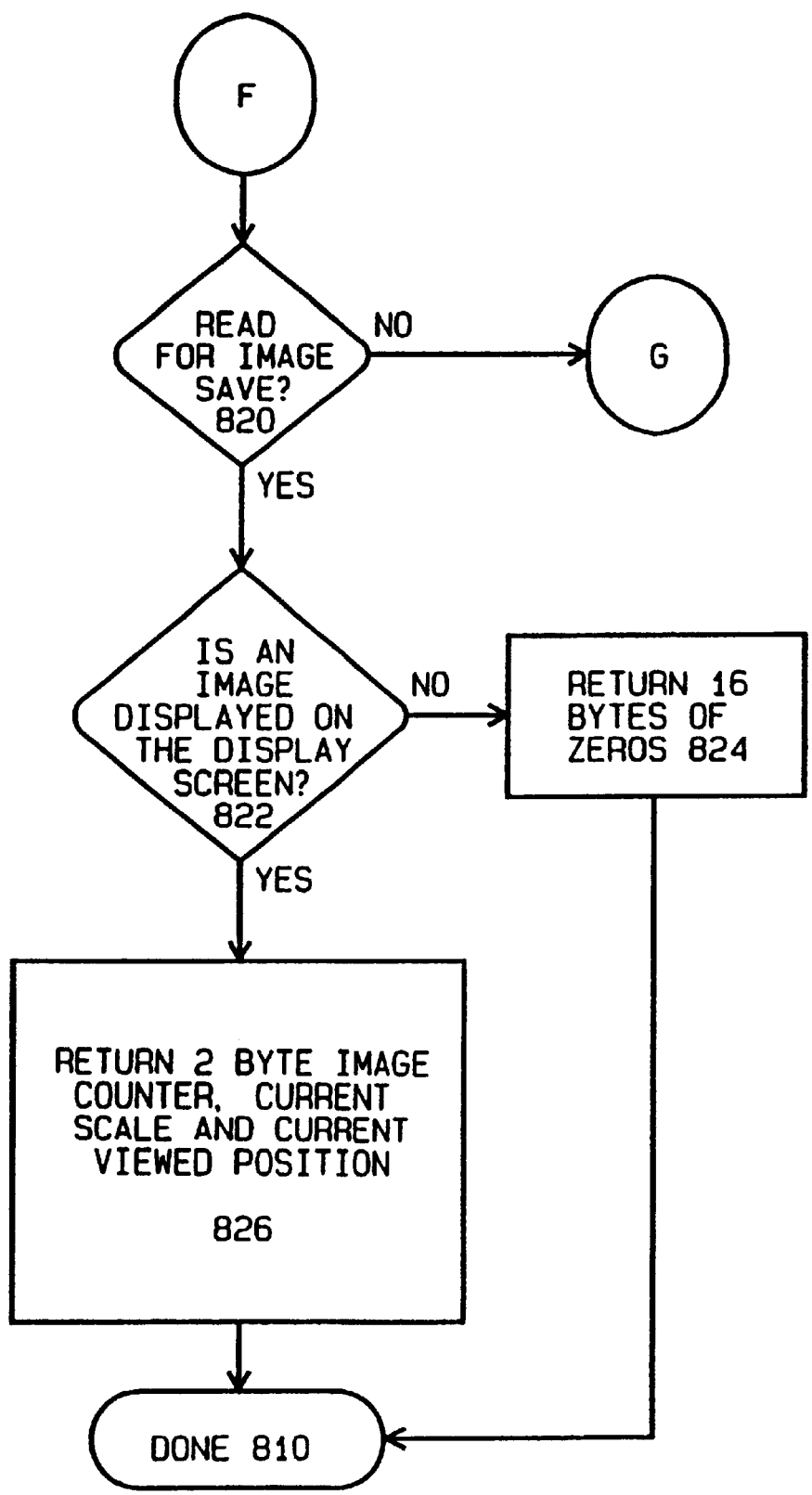

Referring to FIG. 8B, when a read outstanding status command is not identified at block 816 in FIG. 8A, then NPT 14 checks whether this is a read for image save command as indicated at a decision block 820. When a read for image save command is identified, NPT 14 checks whether an image is displayed on the display screen as indicated at a decision block 822. When an image is not displayed on the display screen, NPT 14 returns sixteen bytes of zeros as indicated at a block 824. When an image is displayed on the display screen, NPT 14 returns the two byte image counter, current scale and current viewed position data as indicated at a block 826. The image NPT 14 supports local scrolling of image data without support from the WSC 18 or host processor 16. The current viewed position is the x and y pixel coordinates within the image presentation space currently being viewed. This completes the sequential steps as indicated at a block 810.

Figure 8C:
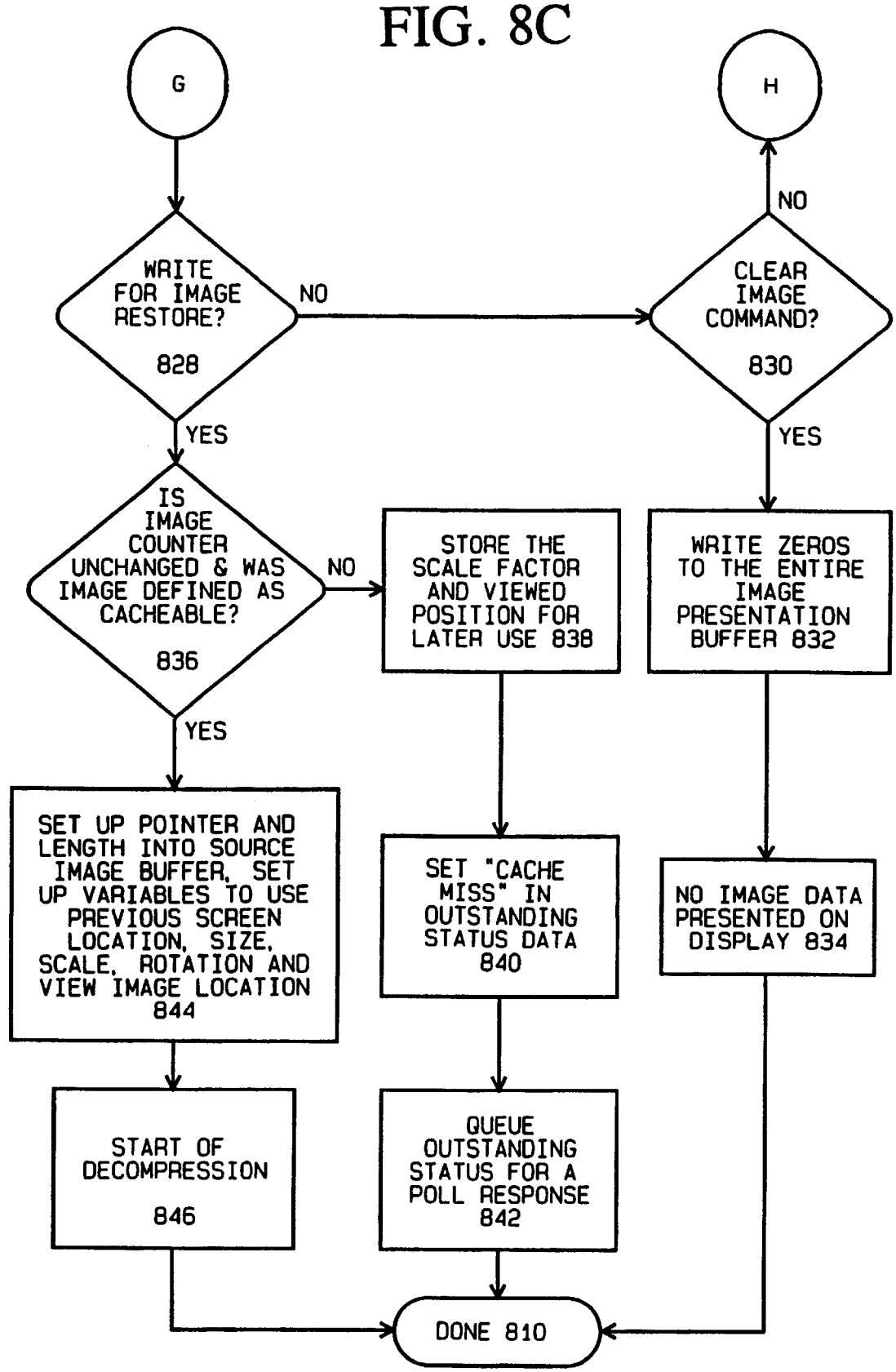

Referring to FIGS. 8B and 8C, when a read for image save command is not identified at block 820 in FIG. 8B, then NPT 14 checks whether this is a write for image restore command as indicated at a decision block 828. If not, then NPT 14 checks whether this is a clear image command as indicated at a decision block 820. If it is a clear image command, NPT 14 writes zeros to the entire image presentation buffer as indicated at a block 832. Then NPT 14 causes image logic 44 not be present image data on display 28 as indicated at a block 834. This completes the sequential steps as indicated at a block 810.

Otherwise, when a write for image restore command is identified at block 828, then NPT 14 checks whether the image counter is unchanged and whether the image was defined as cacheable as indicated at a decision block 836. Defining an image as cacheable requires the host processor to provide a unique image name. A user could use a different application which removes a previously cached image/fax from cache memory. Defining an image as cacheable can allow the image/fax to be restored without requiring the image/fax data to be downloaded again, thereby providing a significant performance improvement. A cache allowed flag indicates to the NPT 14 whether the image/fax can remain in cache memory.

When determined that either the image counter has changed or the image was not defined as cacheable, NPT 14 stores the scale factor and viewed position for later use as indicated at a block 838. NPT 14 sets the cache miss in outstanding status data as indicated at a block 840. Then NPT 14 queues the outstanding status for a poll response as indicated at a block 842 and the sequential steps are completed as indicated at a block 810. When NPT 14 determines that the image counter is unchanged and the image was defined as cacheable, NPT 14 sets up pointer and length into source image buffer and sets up variables to use the previous screen location, size, scale, rotation and view image location as indicated at a block 844. Then NPT 14 starts decompression on main level as indicated at a block 846. This completes the sequential steps as indicated at a block 810.

Figure 8D:
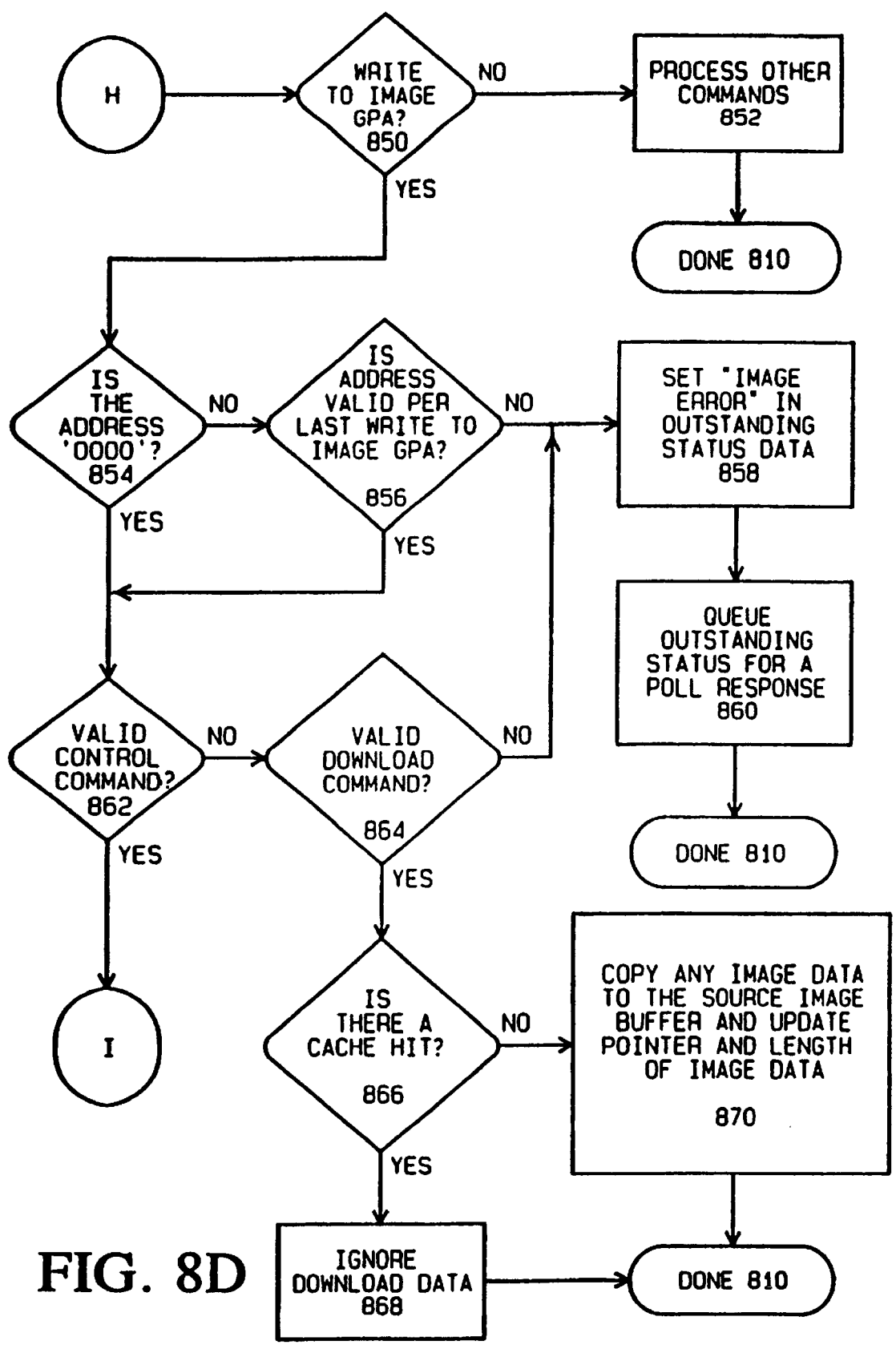

Referring to FIGS. 8C and 8D, when a clear image command is not identified at decision block 830 in FIG. 8C, then NPT 14 checks for a write to image GPA command as indicated at a decision block 850. If not a write to image GPA command, then NPT 14 processes other commands as indicated at a block 852, for example, write screen data and move cursor. This completes the sequential steps as indicated at a block 810. When it is a write to image GPA command, then NPT 14 checks whether the address is '0000' as indicated at a decision block 854. If the address is not '0000', NPT 14 checks whether the address is valid per last write to image GPA as indicated at a decision block 856.

When determined that the address is not valid per last write to image GPA at decision block 854, NPT 14 sets an image error indication in outstanding status data as indicated at a block 858. NPT 14 queues the outstanding status for a poll response as indicated at a block 860. This completes the sequential steps as indicated at a block 810. When determined at block 854 that the address is '0000', NPT 14 checks whether this is a valid control command as indicated at a decision block 862. If not a valid control command, then NPT 14 checks whether this is a valid download command as indicated at a decision block 864. When a valid download command is not identified at decision block 864, then NPT 14 sets an image error indication in outstanding status data at the block 858 and queues the outstanding status for a poll response at the block 860. This completes the sequential steps as indicated at a block 810. When a download command is identified at decision block 864, then NPT 14 determines if there is a cache hit as indicated at a decision block 866. A cache hit occurs when the image was defined as cacheable and the names of the images are equal or match. For example, image names can be up to 256 characters in length. If the cache does match, NPT 14 ignores the download data as indicated at a block 868. If a cache hit is not identified, the NPT 14 copies any image data to the source image buffer and updates pointer and length of image data as indicated at a block 870. This completes the sequential steps as indicated at a block 810.

Figure 8E:
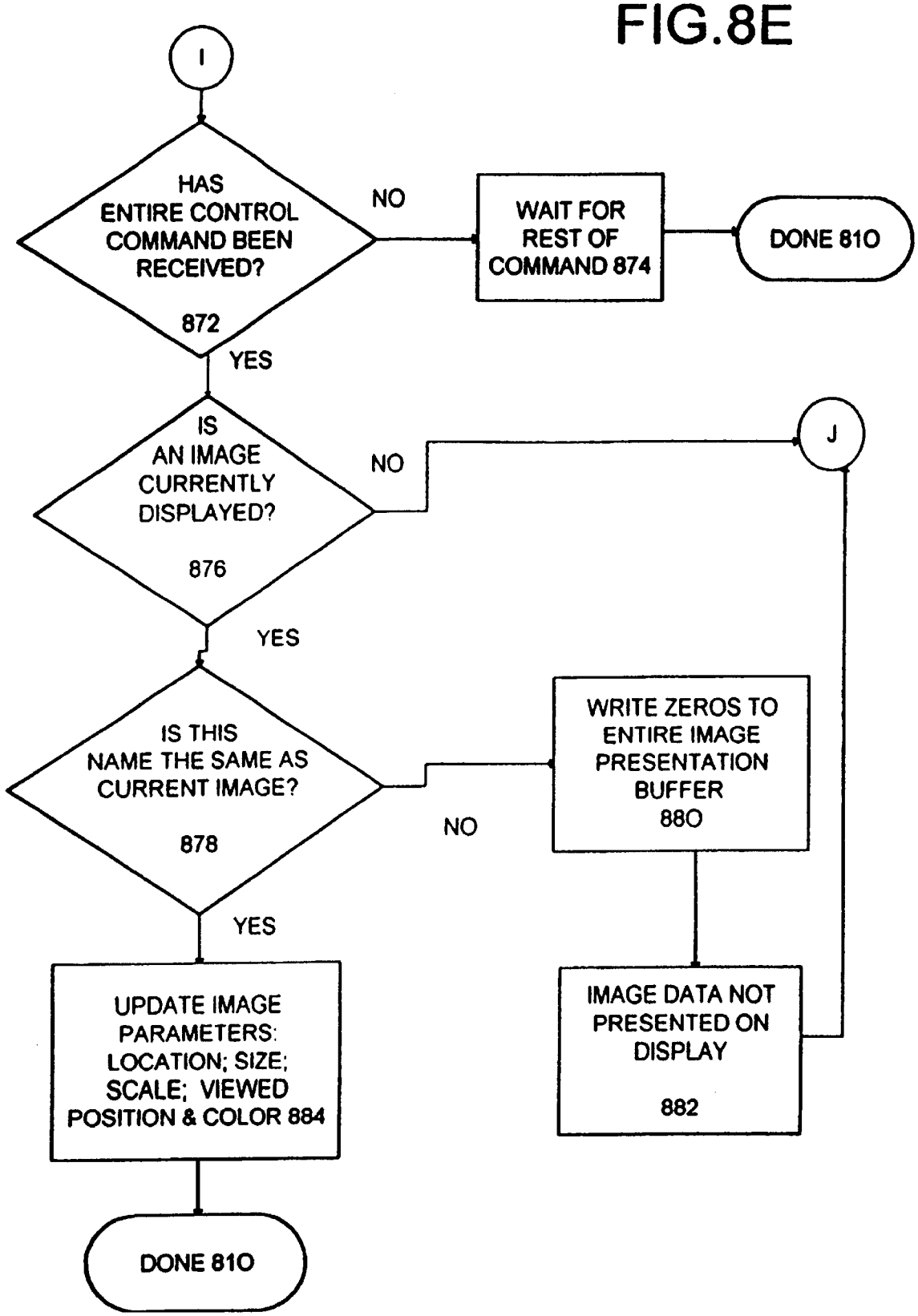

Referring to FIGS. 8D and 8E, when a valid control command is identified at decision block 862 in FIG. 8D, NPT 14 determines whether the entire control command has been received as indicated at a decision block 872 in FIG. 8E. If the entire control command is not identified at block 872, then NPT 14 waits for the rest of the command as indicated at a block 874 and to complete the sequential operations. When an entire control command is identified at block 872, then NPT 14 checks whether an image is currently displayed as indicated at a decision block 876. If an image is currently displayed, NPT 14 determines whether this name is the same as current image as indicated at a decision block 878. If the name is not the same as the current, NPT 14 writes zeros to the entire image presentation buffer as indicated at a block 880. NPT 14 then presents no image data on display as indicated at a block 882. Otherwise when the name is the same as the current, NPT 14 updates image parameters including location, size, foreground and background color, scale and viewed position as indicated at a block 884. The application may be requesting a change in the location of the image, the size of the image, foreground and background color, the scaling of the image or the like. A scaling factor change could be an increment or decrement from the current scale factor. This completes the sequential steps as indicated at a block 810.

Figure 8F:
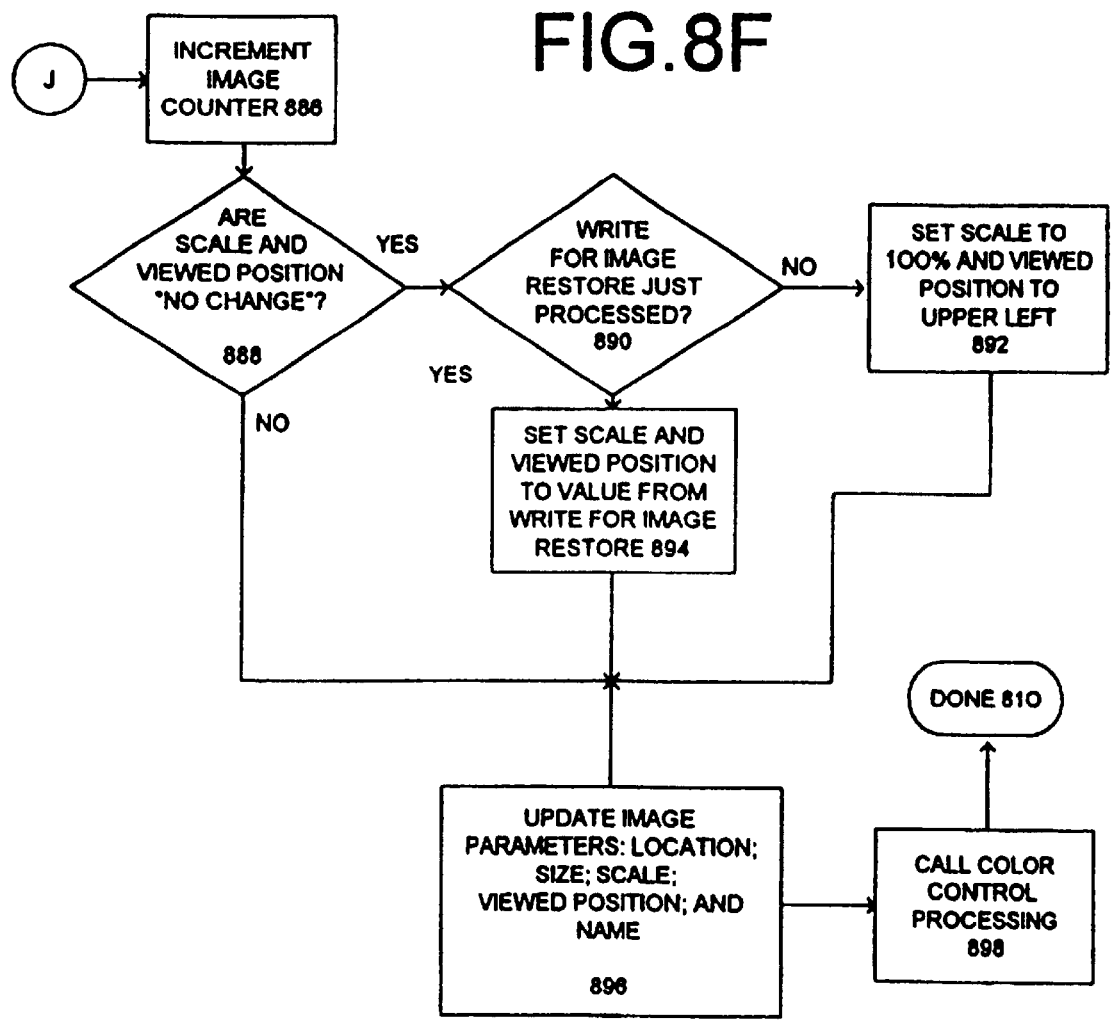

Referring to FIGS. 8E and 8F, after image data is not presented on the display at the block 882 or when determined that an image is not currently displayed at decision block 876, then NPT 14 increments the image counter as indicated at a block 886. Since zero is a reserve value for the image counter, when incrementing at block 886 results in the image counter being zero, then the image counter is set to one. Next NPT 14 determines whether the scale and viewed position are no change as indicated at a decision block 888. When no change is identified for the scale and viewed position, NPT 14 checks whether a write for image restore was just processed as indicated at a decision block 890. If a write for image restore was not just processed, NPT 14 sets the scale to 100% and viewed position to upper left as indicated at a block 892. Otherwise, when a write for image restore was just processed, NPT 14 sets the scale and viewed position to value from write for image restore as indicated at a block 894. Then the user will see the same portion of the restored image at the previous scaling factor. After the scale and viewed position are set at block 892 or block 894, and when the scale and viewed position have changed, then NPT 14 updates image parameters including location, size, scale, viewed position and name as indicated at a block 896. Next a color control processing sequence is called as indicated at a block 898. The color control processing sequence is illustrated and described with respect to FIGS. 12A and 12B. This completes the sequential steps as indicated at a block 810.

Figure 9:
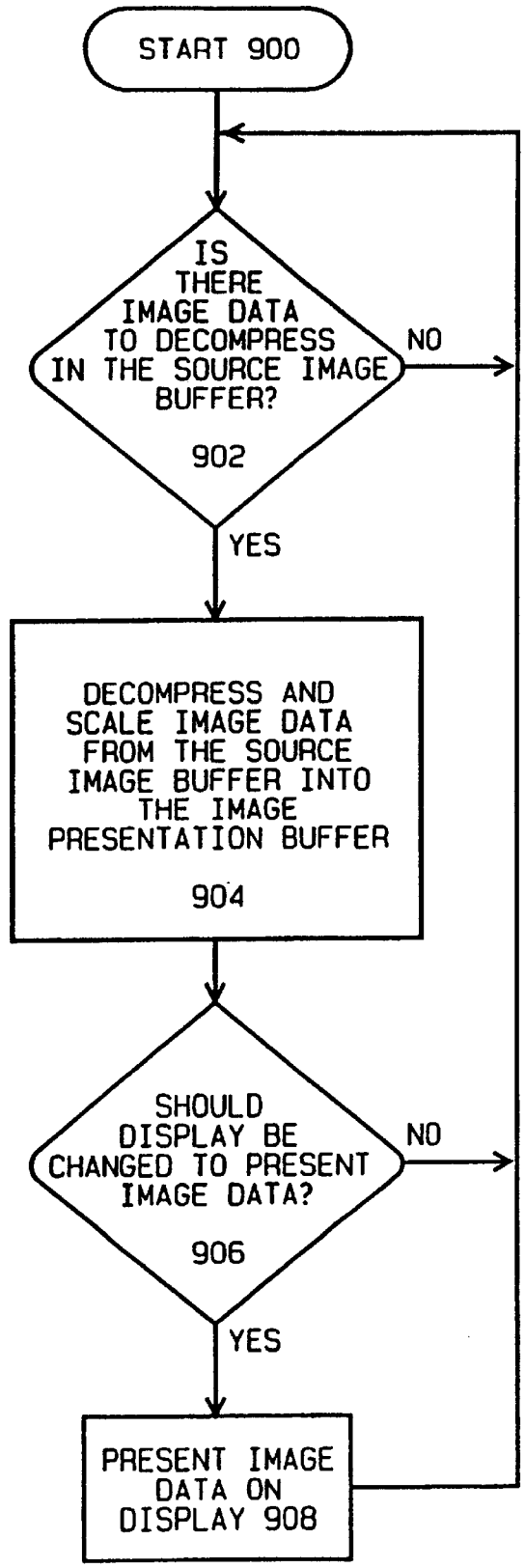
FIG. 9 is a flow chart illustrating the sequential steps for NPT image data processing in accordance with the method of the present invention.

FIG. 9 is a flow chart illustrating the sequential steps for NPT image processing at a main level. The main level processing can be interrupted by a user keystroke, a user mouse event and a command or poll from the WSC 18. The sequential steps start as indicated at a block 900. NPT 14 checks whether there is image data to decompress in the source image buffer as indicated at a decision block 902. When there is image data to decompress in the source image buffer, NPT 14 decompresses and scales the image data from the source image buffer into the image presentation buffer as indicated at a block 904. If there is no image data to decompress in the source image buffer, NPT 14 returns to checking at block 90. After decompressing and scaling the image data, NPT 14 determines whether the display should be changed to present image data as indicated at a decision block 906. If not, then NPT 14 returns to checking at block 902. If yes, then image logic 44 within the NPT 14 presents image data on display as indicated at a block 908. NPT 14 then returns to checking at block 902.

Figure 10:
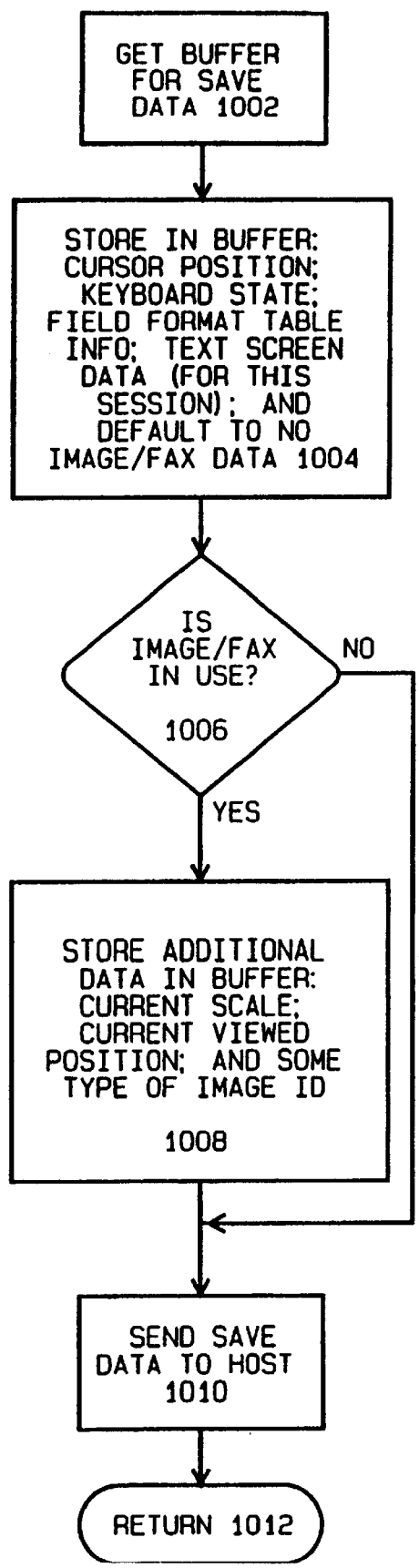
FIG. 10 is a flow chart illustrating the sequential steps for programmable work station (PWS) save command processing in accordance with the method of the present invention.

FIG. 10 is a flow chart illustrating the sequential steps for PWS save command processing. First PWS 15 gets the buffer for save data as indicated at a block 1002. PWS 15 stores save data in the buffer including cursor position, keyboard state, field format table information, text screen data for this session and default to no image/fax data as indicated at a block 1004. Then PWS 15 checks whether image/fax is in use as indicated at a decision block 1006. When determined that image/fax is in use at block 1006, then PWS 15 stores additional data in the buffer including current scale, current viewed position and some type of image identification (for example, an image counter as in NPT 14) as indicated at a decision block 1008. Then, and when determined that image/fax is not in use at block 1006, PWS 15 sends the save data to the host processor 16 as indicated at a block 1010. Then the sequential operations return as indicated at a block 1012.

Figure 11:
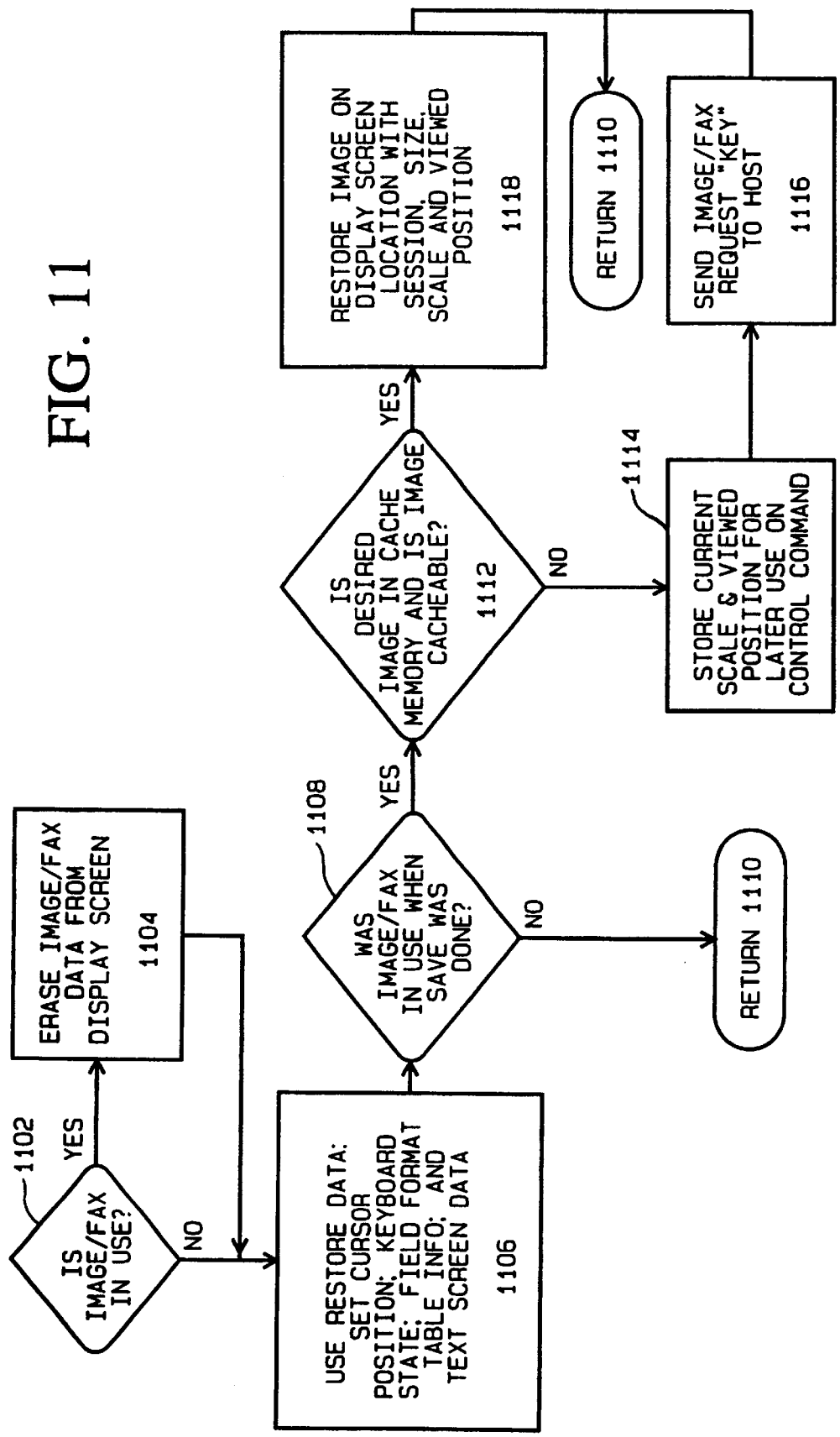
FIG. 11 is a flow chart illustrating the sequential steps for PWS restore command processing in accordance with the method of the present invention.

FIG. 11 is a flow chart illustrating the sequential steps for PWS restore command processing. First PWS 15 checks whether image/fax is in use as indicated at a decision block 1102. When determined that image/fax is in use at block 1102, then PWS 15 erases the image/fax data from the display screen as indicated at a block 1104. Otherwise, when determined that image/fax is not in use at block 1102, then PWS 15 uses the restore data including set cursor position, keyboard state, field format table information and test screen data as indicated at a block 1106. Next PWS 15 determines whether the image/fax was in use when save was done as indicated at a decision block 1108. When determined that the image/fax was not in use when save was done, then the sequential operations return as indicated at a block 1110. When the image/fax was in use when save was done, then PWS 15 checks whether the desired image is in cache memory and if the image is cacheable as indicated at a decision block 1112. If either the desired image is not in cache memory or if the image is not cacheable, then PWS 15 stores the current scale and viewed position for later use on the next control command as indicated at a block 1114. Next PWS 15 sends an image/fax request "key" to host processor 16 as indicated at a block 1116, then the sequential operations return as indicated at a block 1110. Otherwise, when the desired image is in cache memory and the image is cacheable, then PWS 15 restores the image on display screen location with session, size, scale and viewed position as indicated at a block 1118. Then the sequential operations return as indicated at a block 1110.

Figure 12A:
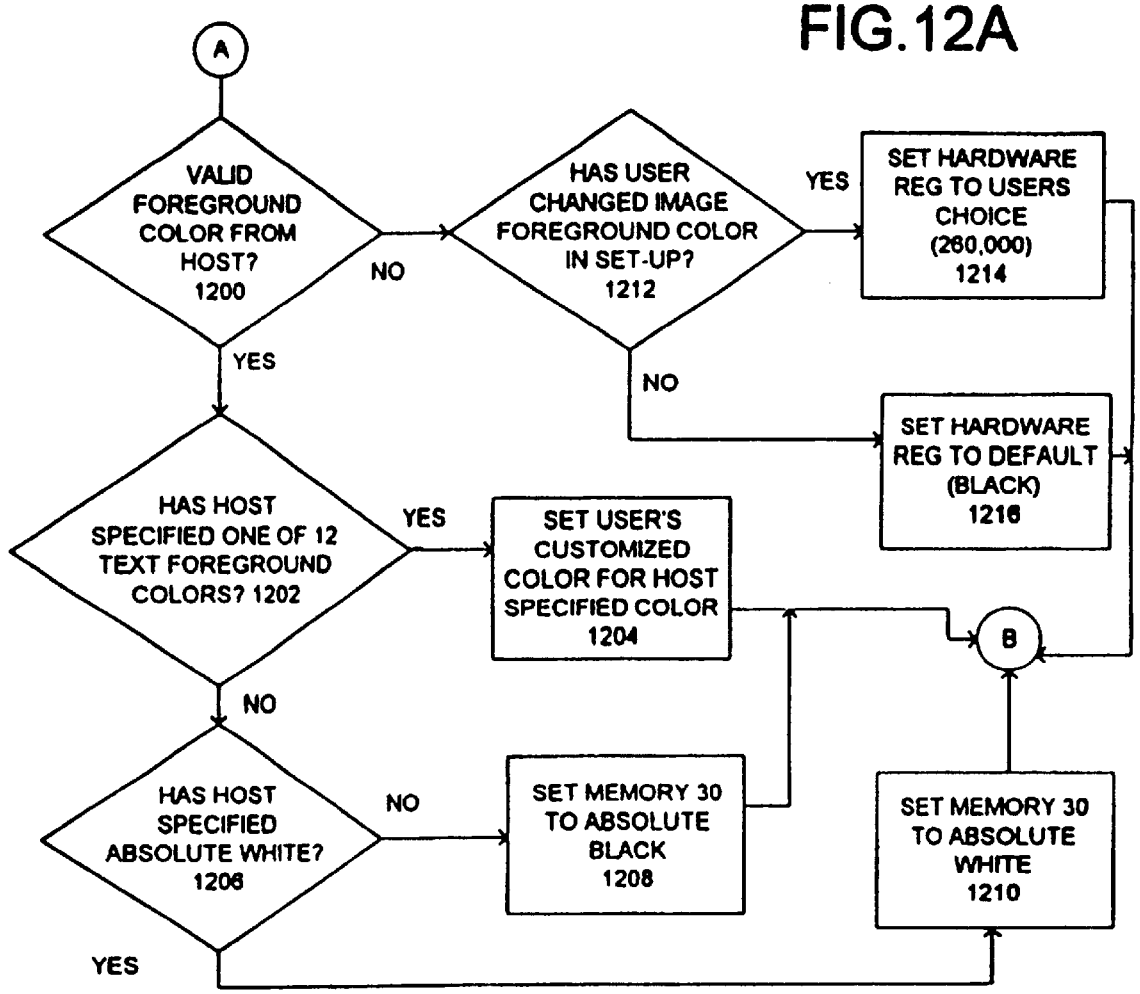
FIGS. 12A, 12B, 12C and 12D together provide a flow chart illustrating the sequential steps for NPT processing of foreground and background color control in accordance with the method of the present invention.
Figure 12B:
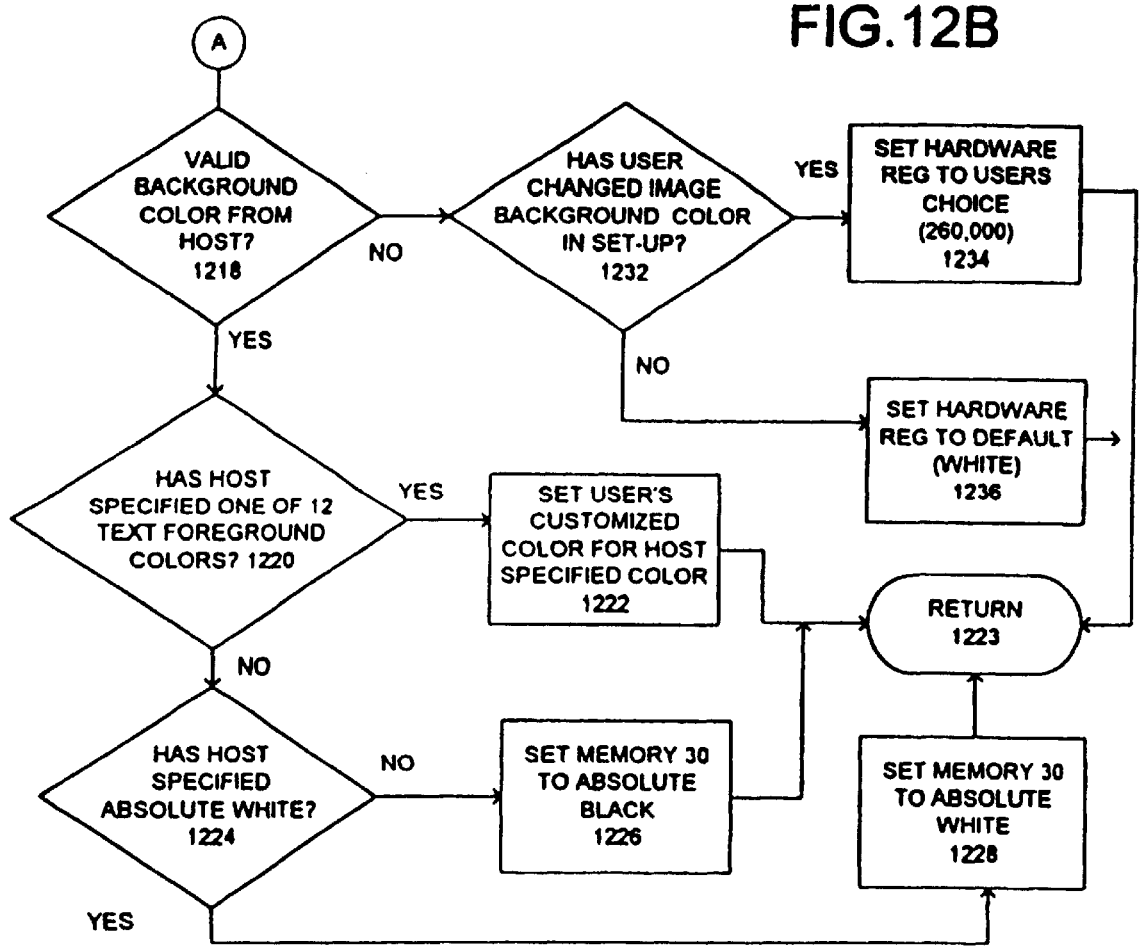

Referring now to FIGS. 12A, 12B, 12C and 12D, there is shown a flow chart illustrating sequential steps for NPT processing of foreground and background color control for the image/fax data display. In FIG. 12A, NPT 14 determines whether the host application has specified a valid image foreground color as indicated at a decision block 1200. An image foreground color selection of text character white and text alternate white is not allowed and would be identified as invalid at decision block 1200. NPT 14 determines whether a particular color from a predetermined set of colors, for example, one of twelve text foreground colors, has been specified by the host application as indicated at a decision block 1202. When a particular host-specified image foreground color is identified by NPT 14 at decision block 1202, then memory 30 of NPT 14 is set to the user customized text color for the identified particular host-specified image color as indicated at a block 1204. Otherwise when a host-specified color is not identified at decision block 1202, then NPT 14 determines whether the host has specified absolute white at a decision block 1206. If absolute white has not been specified by the host application, then memory 30 of NPT 14 is set to absolute black as indicated at a block 1208. Otherwise, when absolute white is identified at block 1206, memory 30 of NPT 14 is set to absolute white as indicated at a block 1210. Then sequential processing continues to identify a background color as shown in FIG. 12B. When either an invalid image foreground color or no host-specified color is identified at decision block 1200, then NPT 14 determines whether the NPT user has changed the image foreground color in a set-up mode as indicated at a decision block 1212. When a user-selected image foreground color is identified at decision block 1212, then the memory 30 of NPT 14 is set to the user-selected color as indicated at a block 1214. Otherwise memory 30 is set with a default black value as indicated at a block 1216. Then the sequential steps are continued with FIG. 12B to identify a background color.

Referring now to FIG. 12B, NPT 14 determines whether the host application has specified a valid image background color as indicated at a decision block 1218. As in FIG. 12A for background color selection, an image background color selection of text white or text alternate white is not allowed and would be identified as invalid at decision block 1218. When a valid host-specified background color is identified at decision block 1218, NPT 14 determines whether a particular color from a predetermined set of colors, for example, one of twelve text foreground colors, has been specified by the host application as indicated at a decision block 1220. When a particular host-specified image background color is identified by NPT 14 at decision block 1220, then memory 30 of NPT 14 is set to the user customized text color for the identified particular host-specified image color as indicated at a block 1222 and returns as indicated at block 1223 to block 810 in FIG. 8F. Otherwise when a host-specified color is not identified at decision block 1220, then NPT 14 determines whether the host has specified absolute white at a decision block 1224. If absolute white has not been specified by the host application, then memory 30 of NPT 14 is set to absolute black as indicated at a block 1224. Otherwise, when host-specified absolute white is identified at block 1224, memory 30 of NPT 14 is set to absolute white as indicated at a block 1228. When either an invalid image background color or no host-specified color is identified at decision block 1218, then NPT 14 determines whether the NPT user has changed the image background color in the set-up mode as indicated at a decision block 1232. When a user-selected image background color is identified at decision block 1232, then the memory 30 of NPT 14 is set to the user-selected color as indicated at a block 1234. Otherwise a default value for white is set in the memory 30 as indicated at a block 1236. Then sequential processing returns with the completion the sequential steps.

A user selected color is defined by a predetermined number, such as, three data bytes with one data byte used per primary color, red, green and blue. Each of the three data bytes provide $2^6$ possible values to provide 64*64*64 or 262,144 possible user selections. Setting each bit of the three data bytes to one provides white. Setting each bit of the three data bytes to zero provides black. With a bi-level monochrome image implementation, providing the user 262,144 selections enables the user to tailor the NPT 14 to their specific preference for image contrast with specified shade of the black foreground and white background.

Figure 12C:
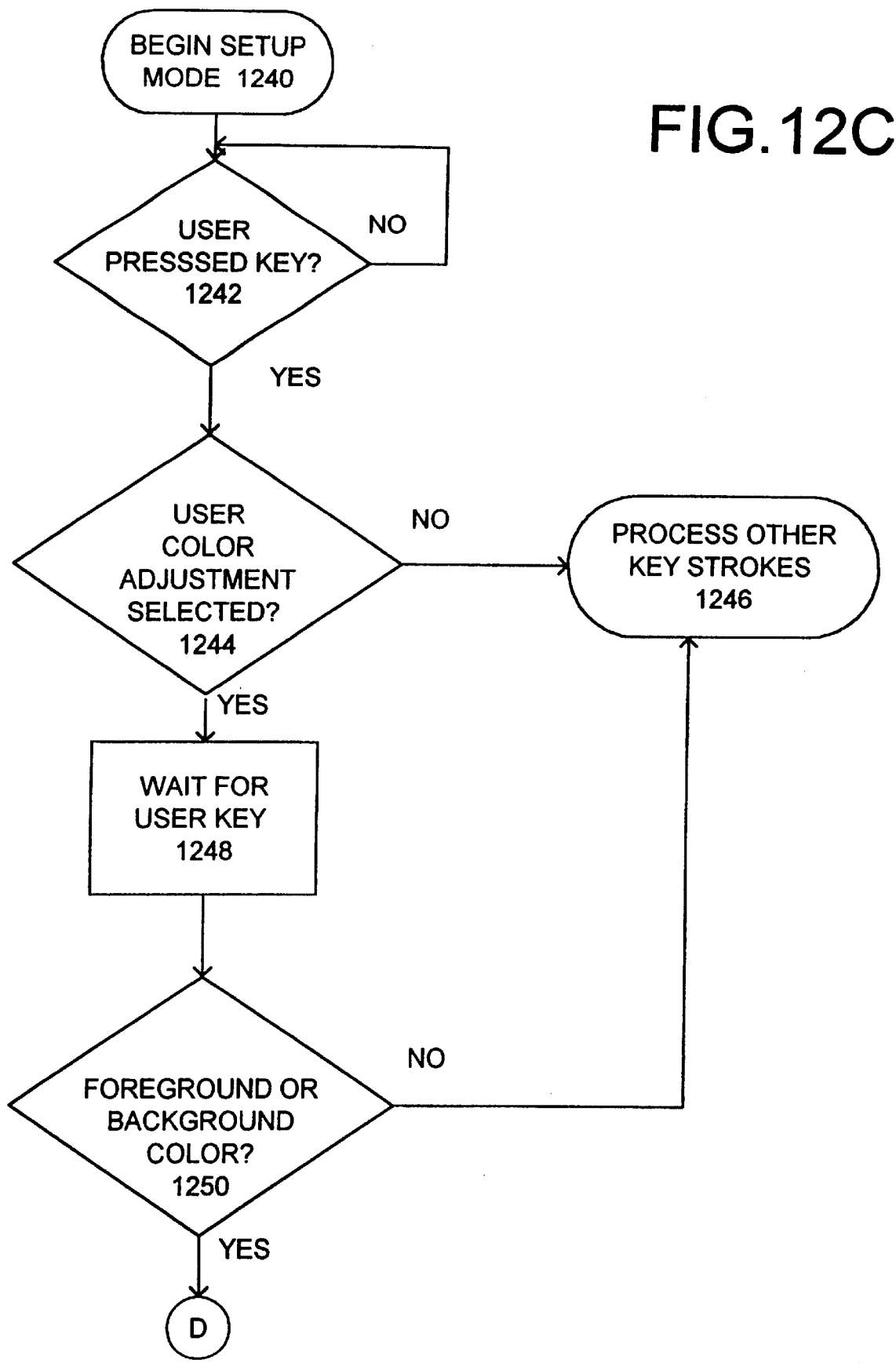
Figure 12D:
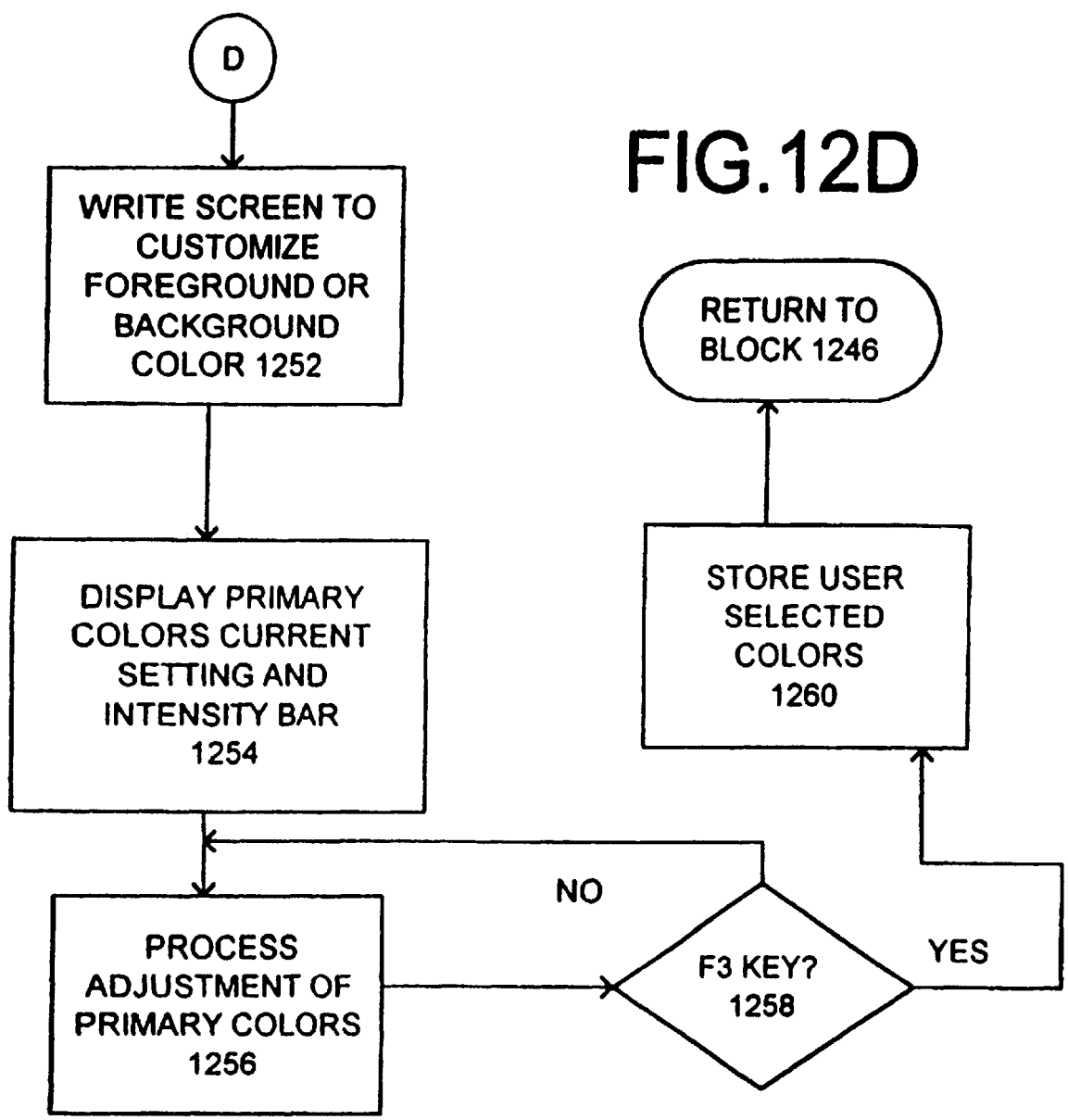

Referring to FIGS. 12C and 12D, there are shown sequential operations for user adjustment of the foreground and background color of a setup mode that begin as indicated at a block 1240. NPT 14 checks for a user pressed key at a decision block 1242. When a user pressed key is identified at block 1242, then NPT 14 determines whether a user color adjustment has been selected as indicated at a decision block 1244. When a user color adjustment is not identified at decision block 1214, then the other key strokes are processed as indicated at a block 1246, for example, a F3 keystroke to exit from the setup mode. When a user color adjustment selection is identified at decision block 1244, then NPT 14 waits for a user key as indicated at a block 1248. When a user key is received, NPT 14 checks whether an image foreground or background color has been selected at a decision block 1250. When determined that image foreground or background color has not been selected at decision block 1250, then NPT 14 processed the other key strokes at block 1246.

Referring also to FIG. 12D, otherwise when determined that image foreground or background color has been selected at decision block 1250, then NPT writes a screen to customize either the image foreground or image background color that was selected by the user as indicated at a block 1252. NPT 14 displays the primary colors of red, green and blue in three rows together with a respective intensity bar of 64 column positions to the right of each of the primary colors as indicated at a block 1254. Then NPT 14 processes the user adjustments of the primary colors as indicated at a block 1256. NPT 14 checks for a F3 user exit key as indicated at a decision block 1258. Until the F3 key is identified, processing of the user adjustments at block 1256 is continued. When the F3 key is identified, then NPT 14 stores the user selected colors as indicated at a block 1260. Then the operations return as indicated at a block 1260 to continue with processing other key strokes at block 1246 in FIG. 12C.

While the invention has been described with reference to details of the illustrated embodiments, these details are not intended to limit the scope of the invention as defined in the appended claims.

We claim:

1. Apparatus for displaying image and facsimile data on a non-programmable-terminal (NPT) coupled to a host computer comprising:

host computer means for generating control and download command data for displaying the image and facsimile data;

non-programmable-terminal means responsive to said host computer generated control and download command data for processing received image and facsimile data for presentation on a NPT display screen; and said non-programmable-terminal processing means including means for identifying a valid foreground color selected by said host computer means; means for identifying a valid background color selected by said host computer means; means responsive to identifying a host selected valid background color for setting said identified host selected valid background color; means responsive to identifying a host selected valid foreground color for setting said identified host selected valid foreground color; means responsive to not identifying a host selected valid background color for identifying and setting a user selected valid background color; means responsive to not identifying a host selected valid foreground color for identifying and setting a user selected valid foreground color.

2. Apparatus as recited in claim 1 further includes means for setting a default background color responsive to not identifying a user selected background color and means for setting a default foreground color responsive to not identifying a user selected foreground color.

3. Apparatus as recited in claim 1 wherein said means for identifying a valid foreground color selected by said host computer means include means for identifying a plurality of predetermined foreground colors corresponding to said host selected valid foreground colors.

4. Apparatus as recited in claim 1 wherein said means for setting said identified host selected valid foreground color include means for identifying a plurality of predetermined foreground colors corresponding to said host selected valid foreground color and means responsive to identifying one of said host-selected predetermined foreground colors for setting a user customized color for said identified one of said host-selected predetermined colors.

5. Apparatus as recited in claim 1 wherein said means for identifying a valid background color selected by said host computer means include means for identifying a plurality of predetermined background colors corresponding to said host selected valid foreground colors.

6. Apparatus as recited in claim 1 wherein said means for setting said identified host selected background color include means for identifying a plurality of predetermined background colors corresponding to said host selected valid background color and means responsive to identifying one of said host-selected predetermined background colors for setting a user customized color for said identified one of said host-selected predetermined colors.

7. Apparatus as recited in claim 1 wherein said non-programmable-terminal processing means include setup mode control means for processing user adjustments of foreground and background colors.

8. Apparatus as recited in claim 3 wherein each of said means for identifying and setting said user selected foreground color and said means for identifying and setting said user selected background color include memory for storing three data bytes for representing 262,144 user selected colors.

9. A method for displaying image and facsimile data on a host-based application display comprising the steps of:

utilizing a host computer, generating control and download command data for displaying the image or facsimile data;

utilizing memory and image logic functions associated with said host-based application display, processing received image and facsimile data for presentation on said display including the steps of;

identifying a valid background color selected by said host computer and setting said identified host selected valid background color;

identifying a host selected valid foreground color and setting said identified host selected valid foreground color;

identifying and setting a user selected valid background color when a host selected valid background color is not identified; and identifying and setting a user selected valid foreground color when a host selected valid foreground color is not identified.

10. A method as recited in claim 9 further includes the steps of:

setting a default background color responsive to not identifying a user selected background color; and setting a default foreground color responsive to not identifying a user selected foreground color.

11. A method as recited in claim 9 wherein each of said steps of identifying a host selected valid foreground color and identifying a host selected valid background color include identifying a plurality of predetermined colors corresponding to said host selected valid background and foreground colors.

12. A method as recited in claim 9 wherein each of said steps of setting said host selected valid foreground color and setting said host selected valid background color include identifying a plurality of predetermined colors corresponding to said host selected valid background and foreground colors and setting a user customized color for an identified one of said host-selected predetermined colors.

* * * * *

UNITED STATES PATENT AND TRADEMARK OFFICE
CERTIFICATE OF CORRECTION

PATENT NO. : 6,275,199 B1                  Page 1 of 1
DATED : August 14, 2001
INVENTOR(S) : Kenneth Dale Aaker et al.

It is certified that error appears in the above-identified patent and that said Letters Patent is hereby corrected as shown below:

<u>Column 14,</u>
Line 53, after "data", insert:
-- on the non-programmable-terminal (NPT) --
Line 54, before "non-programmable-terminal means", insert:
-- the non-programmable-terminal (NPT) including --
Line 58, after "non-programmable-terminal", insert:
-- received image and facsimile data --

<u>Column 15,</u>
Line 6, after "claim 1" insert:
-- wherein said non-programmable-terminal received image and facsimile data processing means --

<u>Column 16,</u>
Line 2, after "display" insert:
-- , said host-based application display implemented in a non-programmable-terminal, said method --
Line 5, after "data" insert:
-- on the non-programmable-terminal (NPT) --
Line 25, before "setting" insert:
-- utilizing memory and image logic functions associated with said non-programmable-terminal host-based application display, --

Signed and Sealed this

Seventh Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,275,199 B1 Page 1 of 1
DATED : August 14, 2001
INVENTOR(S) : Kenneth Dale Aaker et al.

It is certified that error appears in the above-identified patent and that said Letters Patent is hereby corrected as shown below:

Column 14,
Line 53, after "data", insert -- on the non-programmable-terminal (NPT) --
Line 54, before "non-programmable-terminal means", insert -- the non-programmable-terminal (NPT) including --
Line 58, after "non-programmable-terminal", insert -- received image and facsimile data --

Column 15,
Line 6, after "claim 1" insert -- wherein said non-programmable-terminal received image and facsimile data processing means --

Column 16,
Line 2, after "display" insert -- , said host-based application display implemented in a non-programmable-terminal, said method --
Line 5, after "data" insert -- on the non-programmable-terminal (NPT) --
Line 25, before "setting" insert -- utilizing memory and image logic functions associated with said non-programmable terminal host-based application display, --

Signed and Sealed this

Twenty-fifth Day of February, 2003

JAMES E. ROGAN
*Director of the United States Patent and Trademark Office*